(12) United States Patent
Nagaoka et al.

(10) Patent No.: US 7,672,510 B2
(45) Date of Patent: Mar. 2, 2010

(54) VEHICLE ENVIRONMENT MONITORING DEVICE

(75) Inventors: Nobuharu Nagaoka, Nasu-gun (JP);
Masakazu Saka, Utsunomiya (JP);
Takayuki Tsuji, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1587 days.

(21) Appl. No.: 10/928,768

(22) Filed: Aug. 27, 2004

(65) Prior Publication Data

US 2005/0063565 A1 Mar. 24, 2005

(30) Foreign Application Priority Data

Sep. 1, 2003 (JP) ............................. 2003-309059

(51) Int. Cl.
*G06K 9/00* (2006.01)
*G06K 9/34* (2006.01)
*G06K 9/38* (2006.01)
*G06K 9/46* (2006.01)
*G06K 9/66* (2006.01)

(52) U.S. Cl. ................. 382/170; 382/168; 382/169; 382/171; 382/172; 382/173; 382/104; 382/181; 382/190; 382/203

(58) Field of Classification Search ................... None
See application file for complete search history.

(56) References Cited

U.S. PATENT DOCUMENTS

| | | | | | |
|---|---|---|---|---|---|
| 4,823,194 | A | * | 4/1989 | Mishima et al. | 382/190 |
| 4,916,640 | A | * | 4/1990 | Gasperi et al. | 382/291 |
| 5,059,796 | A | * | 10/1991 | Nakamura | 250/330 |
| 5,442,716 | A | * | 8/1995 | Otsu et al. | 382/181 |
| 5,475,494 | A | * | 12/1995 | Nishida et al. | 356/4.01 |
| 5,710,830 | A | * | 1/1998 | Holeva | 382/173 |
| 5,978,100 | A | * | 11/1999 | Kinjo | 358/453 |
| 5,978,497 | A | * | 11/1999 | Lee et al. | 382/133 |
| 5,992,753 | A | * | 11/1999 | Xu | 235/472.01 |
| 6,088,468 | A | * | 7/2000 | Ito et al. | 382/103 |
| 6,088,471 | A | * | 7/2000 | Setlak et al. | 382/124 |

(Continued)

FOREIGN PATENT DOCUMENTS

JP 8-313632 11/1996

(Continued)

*Primary Examiner*—Vikkram Bali
*Assistant Examiner*—Michelle Entezari
(74) *Attorney, Agent, or Firm*—Carrier, Blackman & Associates, P.C.; Joseph P. Carrier; William D. Blackman

(57) ABSTRACT

A vehicle environment monitoring device identifies objects from an image taken by an infrared camera. Object extraction from images is performed in accordance with the state of the environment as determined by measurements extracted from the images as follows: N1 binarized objects are extracted from a single frame. Height of a grayscale objects corresponding to one of the binarized objects are calculated. If a ratio of the number of binarized objects C, where the absolute value of the height difference is less than the predetermined value $\Delta H$, to the total number N1 of binarized objects, is greater than a predetermined value X1, the image frame is determined to be rainfall-affected. If the ratio is less than the predetermined value X1, the image frame is determined to be a normal frame. A warning is provided if it is determined that the object is a pedestrian and if a collision is likely.

18 Claims, 23 Drawing Sheets

(1) HEIGHT COMPARISON DURING NORMAL STATE
GRAYSCALE OBJECT BINARIZED OBJECT (2) HEIGHT COMPARISON DURING RAINFALL
GRAYSCALE OBJECT BINARIZED OBJECT

U.S. PATENT DOCUMENTS

| | | | |
|---|---|---|---|
| 6,327,536 B1 * | 12/2001 | Tsuji et al. | 701/301 |
| 6,546,113 B1 * | 4/2003 | Lucas et al. | 382/100 |
| 6,775,395 B2 * | 8/2004 | Nishigaki et al. | 382/104 |
| 6,785,402 B2 * | 8/2004 | Jouppi et al. | 382/103 |
| 6,839,457 B1 * | 1/2005 | Azuma et al. | 382/131 |
| 7,391,934 B2 * | 6/2008 | Goodall et al. | 382/305 |
| 7,522,745 B2 * | 4/2009 | Grasso et al. | 382/103 |
| 2002/0005778 A1 * | 1/2002 | Breed et al. | 340/435 |
| 2002/0191850 A1 * | 12/2002 | Neubauer et al. | 382/206 |
| 2003/0138133 A1 | 7/2003 | Nagaoka et al. | |
| 2004/0096121 A1 * | 5/2004 | Kanatsu et al. | 382/290 |
| 2005/0002561 A1 * | 1/2005 | Monachino et al. | 382/159 |
| 2005/0256820 A1 * | 11/2005 | Dugan et al. | 706/52 |
| 2006/0177097 A1 * | 8/2006 | Fujimura et al. | 382/103 |

FOREIGN PATENT DOCUMENTS

| | | |
|---|---|---|
| JP | 2000-030197 | 1/2000 |
| JP | 2001-006096 | 1/2001 |
| JP | 2001-351200 | 12/2001 |

* cited by examiner

BODIES WITHIN FRAMES P1 THROUGH P4 ARE OBJECTS

P1: COORDINATES OF THE TOP POSITION
OF THE BINARIZED OBJECT

HEIGHT OF OBJECT $\Delta Hg$ [m]

AVERAGE LUMINANCE OF AREA1   Ave_A1

BRIGHTNESS DISPERSION OF AREA2   Var_A2

BRIGHTNESS DISPERSION OF AREA3   Var_A3

VEHICLE ENVIRONMENT MONITORING DEVICE

CROSS-REFERENCE TO RELATED APPLICATIONS

The present invention claims priority under 35 USC 119 based on Japanese patent application No. 2003-309059, filed Sep. 1, 2003.

BACKGROUND OF THE INVENTION

1. Field of the Invention

The present invention relates to a vehicle environment monitoring device which identifies objects in the vehicle environment by performing binarization processing of images taken by infrared cameras.

2. Description of Related Art

Conventional vehicle environment monitoring devices identify objects with which the vehicle has a chance of colliding, such as pedestrians, within images of the environment of the vehicle taken by an imaging device such as an infrared camera, and provides this information to the driver of the vehicle. In these apparatuses, parts of the images taken of the vehicle environment by a left and right pair of stereo cameras which show high temperatures are assigned as objects, the distance to the objects is calculated by determining the parallax thereof, and from the direction of movement and position of the objects, those which are likely to affect the traveling of the vehicle are detected, and a warning is output (see Japanese Unexamined Patent Application, First Publication No. 2001-6096, for example).

However, if the identification of pedestrians is performed based only on shape determination as in conventional devices, then due to factors such as the pedestrian wearing a hat, the effect of clothing, or the environment around the pedestrian, the binary shape of the pedestrians themselves on the infrared image may be indeterminate. Moreover, when a vehicle is traveling in general, variation in the shape of the road surface ahead of the vehicle or pitching of the vehicle have an effect on the image, with the result that the heights of a pedestrian, whether an adult or child, may not be detected accurately. Consequently, there is a possibility that the on screen coordinates of the center of gravity of the object cannot be fixed with respect to distance, and the presence of pedestrians alone cannot be determined in a stable manner. Here, in addition to calculating the size of an object in real space from a gray scale image as in conventional devices, methods have been proposed in which only pedestrian-like objects are extracted based on the positional relationships of binarized objects, or in which road side structures and vehicles are extracted from the binarized objects, declared as non-pedestrian objects, and eliminated from consideration as objects which justify a warning.

Furthermore, heat reservoirs such as billboards, walls and utility poles in the general environment, which do not emit heat themselves but store heat received from external sources, tend to disappear from the infrared image (are no longer detected by the infrared cameras) due to their temperature dropping during rainfall, and with heat generators such as vending machines which themselves generate heat, although these are detected by the infrared cameras, during rainfall the portion of infrared radiation reduces (to almost zero). Hence, it is difficult to determine a shape accurately in rainfall conditions. In the same manner, because rainfall can cause variation in the radiant quantity of infrared rays, although exposed parts of people (the head and the like) will be detected, parts covered with clothing will not be detected by the infrared cameras because the clothing is wet. In this manner, the state of the vehicle environment can be different even at the same location depending on whether it is raining or not, and there is variation in the shape of all of the objects on the grayscale images detected by the infrared cameras. Therefore, conventional methods are proposed in which rainfall is detected based on signals from the operation of the wipers of the vehicle or a detection signal of a raindrop sensor, and separate processing is used in normal weather than is used during rainfall.

In addition, methods are proposed in which the state of a histogram of the entire image is used to determine whether or not rain is falling.

Under weather conditions where a large amount of rain continues to fall, it is possible to detect pedestrians in a stable manner by detecting rainfall based on signals from the operation of the wipers of the vehicle or detected signals of a raindrop sensor, and performing separate processing for normal times and times of rainfall, but in different conditions, such as when drizzle or rain begins to fall, ceases falling, or has just finished falling, it is possible that the identification of pedestrians only in a stable manner is impaired. Specifically, because there is no link between the rainfall determination processing performed using the signals from the operation of the wipers of the vehicle or detected signals of a raindrop sensor, and the pedestrian determination processing which identifies pedestrians within the infrared images, under conditions such as when drizzle or rain begins to fall, ceases falling, or has just finished falling, if the signals from the operation of the wipers of the vehicle or detected signals of a raindrop sensor call for the processing to be performed as for normal conditions despite the fact that the pedestrian determination processing for wet weather conditions is more appropriate, it is possible that the ability to determine the shapes of wet bodies accurately is impaired.

Furthermore, the use of a histogram of the entire image to determine whether or not rain is falling is effective in cases where, in an image of a body and its background, the histogram shows variation between times of normal weather and rain in both the body and its background. However, there is a problem in that in cases where there is no variation in the histogram in the background between times of normal weather and rain (if the background of the body is a view of nature such as a rice field, for example), the accuracy of the rainfall determination drops. Specifically, in a situation where no histogram variation is apparent in the background between normal weather and rain and there is one body, it is possible that even if the histogram of the body changes, the amount of variation relative to the histogram of the entire image is too small, which means that variation cannot be distinguished in the histogram in terms of the overall image, and rain cannot be detected accurately (the state of the body cannot be determined).

SUMMARY OF THE INVENTION

The present invention takes the above problems into account with an object of providing a vehicle environment monitoring device which appropriately determines the state of a body (that is, whether rainy conditions exist) from an image taken by a camera, and identifies objects in a stable manner using a method in accordance with the state of the body.

In order to solve the above problems, a vehicle environment monitoring device according to a first aspect of the invention is a vehicle environment monitoring device which detects bodies present in the environment of a vehicle (for example the vehicle 10 described below in the embodiments) from infrared images taken by infrared cameras (for example infrared cameras 2R and 2L described below in the embodiments), which comprises: a binarized object extraction device which by binarizing grayscale images of the infrared images, extracts the bodies as binarized objects (for example the processing in step S7 and step S31 described below in the embodiments); a binarized object feature quantity calculation device which calculates a feature quantity, or quantified features, of the binarized object (for example the processing in step S8 and step S71 described below in the embodiments); an object image extraction device which extracts an image of a grayscale object which corresponds to the binarized object from the grayscale image (for example the processing in step S33 and step S73 described below in the embodiments); an object image feature quantity calculation device which calculates a feature quantity, or quantified features, of the grayscale object (for example the processing in step S33 and step S73 described below in the embodiments); a feature quantity comparison device which compares the feature quantity extracted by the binarized object feature quantity calculation device and the feature quantity extracted by the object image feature quantity calculation device (for example the processing in step S34 described below in the embodiments); and a body state determination device which determines the state of the body based on the results of the comparison performed in the feature quantity comparison device (for example the processing in step S35 through step S52 described below in the embodiments).

The vehicle environment monitoring device comprising the above construction, by a process in which the feature quantity comparison device compares a feature quantity of the binarized object with a feature quantity of the grayscale object, and the body state determination device determines the state of the body based on the comparison results of the feature quantity comparison device, can determine the state of a body from the image itself, including whether or not the body is affected by rainfall or whether the camera lens is dirty.

A vehicle environment monitoring device according to a second aspect of the invention is a vehicle environment monitoring device according to the first aspect, wherein the feature quantity comparison device compares for a plurality of bodies the feature quantity extracted by the binarized object feature quantity calculation device and the feature quantity extracted by the object image feature quantity calculation device, and the body state determination device determines the state of the bodies according to the proportion of bodies specified by the results of the comparison of the feature quantity comparison device.

The vehicle environment monitoring device comprising the above construction, by a process in which the feature quantity comparison device compares the feature quantity of the binarized object and the feature quantity of the grayscale object for a plurality of bodies, can increase the resources used for judgment in the body state determination device, and execute an accurate judgment of the state of the bodies based on the additional resources used for judgment in the body state determination device.

A vehicle environment monitoring device according to a third aspect of the invention is a vehicle environment monitoring device according to the first aspect or the second aspect, wherein the feature quantity comparison device compares the feature quantity extracted by the binarized object feature quantity calculation device and the feature quantity extracted by the object image feature quantity calculation device across a plurality of image frames, and the body state determination device determines the state of the bodies according to the proportion of image frames where the proportion of bodies specified based on the comparison results of the feature quantity comparison device is at or above a predetermined level.

The vehicle environment monitoring device comprising the above construction, by a process in which the feature quantity comparison device compares the feature quantity of the binarized object and the feature quantity of the grayscale object over a plurality of frames, can increase the resources used for judgment in the body state determination device, and execute an accurate judgment of the state of the body based on the additional resources used for judgment in the body state determination device.

A vehicle environment monitoring device according to a fourth aspect of the invention is a vehicle environment monitoring device which detects bodies present in the environment of a vehicle (for example the vehicle 10 described below in the embodiments) from infrared images taken by infrared cameras (for example infrared cameras 2R, 2L described below in the embodiments), which comprises: a binarized object extraction device which by binarizing grayscale images of the infrared images, extracts the bodies as binarized objects (for example the processing in step S7 and step S31 described below in the embodiments); a binarized object feature quantity calculation device which calculates a feature quantity of the binarized objects (for example the processing in step S8 and step S71 described below in the embodiments); an object image extraction device which extracts an image of a grayscale object corresponding to the binarized object from the grayscale image (for example the processing in step S33 and step S73 described below in the embodiments); an object image feature quantity calculation device which calculates a feature quantity of the grayscale image (for example the processing in step S33 and step S73 described below in the embodiments); a pedestrian recognition device which recognizes pedestrians using the feature quantity extracted by the binarized object feature quantity calculation device and the feature quantity extracted by the object image feature quantity calculation device (for example the processing in step S72 and step S74 through step S118 described below in the embodiments); and a feature quantity comparison device which compares the feature quantity extracted by the binarized object feature quantity calculation device and the feature quantity extracted by the object image feature quantity calculation device (for example the processing in step S34 described below in the embodiments), and the pedestrian recognition device changes the pedestrian recognition processing method based on the comparison results of the feature quantity comparison device.

The vehicle environment monitoring device comprising the above construction, by a process in which the feature quantity comparison device compares the feature quantity of the binarized object and the feature quantity of the grayscale object, and the pedestrian recognition device which recognizes pedestrians using the feature quantity of the binarized object and the feature quantity of the grayscale object changes the pedestrian recognition processing method based on the comparison results of the feature quantity comparison device, can determine the pedestrian recognition processing method from the image itself and recognize pedestrians only, in a stable manner.

A vehicle environment monitoring device according to a fifth aspect of the invention is a vehicle environment monitoring device according to the fourth aspect, wherein the feature quantity comparison device compares for a plurality of bodies the feature quantity extracted by the binarized object feature quantity calculation device and the feature quantity extracted by the object image feature quantity calculation device, and the pedestrian recognition device changes the pedestrian recognition processing method according to the proportion of bodies specified based on the results of the comparison of the feature quantity comparison device.

The vehicle environment monitoring device comprising the above construction, by a process in which the feature quantity comparison device compares the feature quantity of the binarized object and the feature quantity of the grayscale object for a plurality of bodies, can increase the resources used for judgment in the pedestrian recognition device, and execute accurate pedestrian recognition based on the additional resources used for judgment in the pedestrian recognition device.

A vehicle environment monitoring device according to a sixth aspect of the invention is a vehicle environment monitoring device according to the fourth aspect or the fifth aspect, wherein the feature quantity comparison device compares the feature quantity extracted by the binarized object feature quantity calculation device and the feature quantity extracted by the object image feature quantity calculation device across a plurality of image frames, and the pedestrian recognition device changes the pedestrian recognition processing method according to the proportion of image frames where the proportion of bodies specified based on the comparison results of the feature quantity comparison device is at or above a predetermined level.

The vehicle environment monitoring device comprising the above construction, by a process in which the feature quantity comparison device compares the feature quantity of the binarized object and the feature quantity of the grayscale object over a plurality of frames, can increase the resources used for judgment in the pedestrian recognition device, and execute accurate pedestrian recognition based on the additional resources used for judgment in the pedestrian recognition device.

A vehicle environment monitoring device according to a seventh aspect of the invention is a vehicle environment monitoring device according to any one of the first through sixth aspects, wherein the feature quantity comparison device compares the height of the binarized object extracted by the binarized object feature quantity calculation device and the height of the grayscale object extracted by the object image feature quantity calculation device.

The vehicle environment monitoring device comprising the above construction, by a process in which the feature quantity comparison device compares the height of the binarized object and the height of the grayscale object, can make the body state determination device execute the accurate body state determination when the two infrared cameras are arranged side by side.

A vehicle environment monitoring device according to an eighth aspect of the invention is a vehicle environment monitoring device according to any one of the first through sixth aspects, wherein the feature quantity comparison device compares the width of the binarized object extracted by the binarized object feature quantity calculation device and the width of the grayscale object extracted by the object image feature quantity calculation device.

The vehicle environment monitoring device comprising the above construction, by a process in which the feature quantity comparison device compares the width of the binarized object and the width of the grayscale object, can make the body state determination device execute the accurate body state determination when the two infrared cameras are arranged vertically.

A vehicle environment monitoring device according to a ninth aspect of the invention is a vehicle environment monitoring device which detects bodies present in the environment of a vehicle (for example the vehicle 10 described below in the embodiments) from infrared images taken by infrared cameras (for example infrared cameras 2R, 2L described in the embodiments below), which comprises: a binarized object extraction device which extracts the bodies as a plurality of binarized objects with different luminance threshold values, by binarizing grayscale images from the infrared cameras according to a plurality of luminance threshold values (for example the processing in step S125, step S141 and step S146 described in the embodiments below); a binarized object feature quantity calculation device which respectively calculates a feature quantity of said plurality of binarized objects with different luminance threshold values (for example the processing in step S125, step S142 through step S145, and step S147 through step S150 described in the embodiments below); a feature quantity comparison device which compares to each other the feature quantities of the plurality of binarized objects with different luminance threshold values extracted by the binarized object feature quantity calculation device (for example the processing in step S126 through step S130 described in the embodiments below); and a body state determination device which determines the state of the bodies based on the comparison results of the feature quantity comparison device (for example the processing in step S131 through step S133 described in the embodiments below).

The vehicle environment monitoring device comprising the above construction, by a process in which the feature quantity comparison device compares to each other the feature quantity of the plurality of binarized objects with different luminance threshold values, and the body state determination device determines the state of the bodies based on the comparison results of the feature quantity comparison device, can determine the state of a body from the image itself, including whether the bodies are affected by rainfall or the camera lens is dirty.

A vehicle environment monitoring device according to a tenth aspect of the invention is a vehicle environment monitoring device according to the ninth embodiment, wherein the feature quantity comparison device compares to each other the feature quantity of the plurality of binarized objects with different luminance threshold values extracted by the binarized object feature quantity calculation device, for a plurality of bodies, and the body state determination device determines the state of the bodies according to the proportion of bodies specified based on the results of the comparison of the feature quantity comparison device.

The vehicle environment monitoring device comprising the above construction, by a process in which the feature quantity comparison device compares the feature quantities of a plurality of binarized objects with different luminance threshold values for a plurality of bodies, can increase the resources used for judgment in the body state determination device, and execute an accurate judgment of the state of the bodies based on the additional resources used for judgment in the body state determination device.

A vehicle environment monitoring device according to an eleventh aspect of the invention is a vehicle environment monitoring device which detects bodies present in the environment of a vehicle (for example the vehicle 10 described below in the embodiments) from infrared images taken by infrared cameras (for example infrared cameras 2R, 2L described below in the embodiments below), which comprises: a binarized object extraction device which extracts the bodies as a plurality of binarized objects with different luminance threshold values, by binarizing grayscale images from the infrared cameras according to a plurality of luminance threshold values (for example the processing in step S125, step S141 and step S146 described in the embodiments below); a binarized object feature quantity calculation device which respectively calculates a feature quantity of the plurality of binarized objects with different luminance threshold values (for example the processing in step S71, step S125, step S1142 through step S145, and step S147 through step S150 described in the embodiments below); an object image extraction device which extracts images of grayscale objects corresponding to the binarized objects from the grayscale images (for example the processing in step S33 and step S73 described in the embodiments below); an object image feature quantity calculation device which calculates a feature quantity of the grayscale objects (for example the processing in step S33 and step S73 described in the embodiments below); a pedestrian recognition device which recognizes pedestrians using the feature quantity extracted by the binarized object feature quantity calculation device and the feature quantity extracted by the object image feature quantity calculation device (for example the processing in step S72 and step S74 through step S1118 described below); and a feature quantity comparison device which compares to each other the feature quantity of the plurality of binarized objects with different luminance threshold values extracted by the binarized object feature quantity calculation device (for example the processing in step S126 through step S130 described in the embodiments below), and the pedestrian recognition device changes the pedestrian recognition processing method based on the comparison results of the feature quantity comparison device.

The vehicle environment monitoring device comprising the above construction, by a process in which the feature quantity comparison device compares to each other the feature quantity of a plurality of binarized objects with different luminance threshold values, and the pedestrian recognition device which recognizes pedestrians using the feature quantity of the binarized object and the feature quantity of the grayscale object changes the pedestrian recognition processing method based on the comparison results of the feature quantity comparison device, can determine the pedestrian recognition processing method from the image itself and recognize pedestrians only, in a stable manner.

A vehicle environment monitoring device according to a twelfth aspect of the invention is a vehicle environment monitoring device according to the eleventh aspect, wherein the feature quantity comparison device compares to each other the feature quantity of the plurality of binarized objects with different luminance threshold values extracted by the binarized object feature quantity calculation device, for a plurality of bodies, and the pedestrian recognition device changes the pedestrian recognition processing method according to the proportion of bodies specified based on the results of the comparison of the feature quantity comparison device.

The vehicle environment monitoring device comprising the above construction, by a process in which the feature quantity comparison device compares the feature quantities of a plurality of binarized objects with different luminance threshold values, for a plurality of bodies, can increase the resources used for judgment in the pedestrian recognition device, and execute accurate pedestrian recognition based on the additional resources used for judgment in the pedestrian recognition device.

According to the vehicle environment monitoring device of the first aspect of the invention, the state of a body, for example whether the body is being affected by rainfall or if the camera lens is dirty or the like, can be determined from the image itself. Accordingly, because the state of a body can be determined without relying on wiper operation signals or detected signals of a raindrop sensor, there is no need to provide the sensors and the like required by these systems, which has an effect whereby the cost is lowered and the reliability of body state determination is improved, and a vehicle environment monitoring device can be realized which can determine the state of a body correctly. Furthermore, in contrast to a case where the state of the histogram of the entire image is used to determine rainfall, the state of the body can be determined directly, which has an effect whereby a vehicle environment monitoring device can be realized which can determine the state of a body precisely and accurately without being affected by the content of the background.

According to the vehicle environment monitoring device of the second or third aspects of the invention, it is possible to increase the resources used for judgment in the body state determination device, and execute accurate determination of the state of the body based on the additional resources used for judgment in the body state determination device. Accordingly, an effect is obtained whereby the reliability of the body state determination performed by the body state determination device is further improved, and determination errors in the body state determination performed by the body state determination device can be prevented.

According to the vehicle environment monitoring device of the fourth aspect of the invention, the pedestrian recognition device can determine the pedestrian recognition processing method from the image itself, and recognize pedestrians only, in a stable manner by changing the pedestrian recognition processing method based on the comparison results of the feature quantity comparison device. Accordingly, because the state of a body can be determined without relying on wiper operation signals or detected signals of a raindrop sensor, there is no need to provide the sensors and the like required by these systems, which has an effect whereby the cost is lowered, the reliability of pedestrian recognition is improved, and a vehicle environment monitoring device can be realized which can recognize pedestrians only, in a stable manner. In addition, an effect is obtained whereby the accuracy of the pedestrian detection can be maintained regardless of the state of the body.

According to the vehicle environment monitoring device of the fifth or sixth aspects of the invention, the resources used for judgment in the pedestrian recognition device are increased, enabling accurate pedestrian recognition to be executed based on the additional resources used for judgment in the pedestrian recognition device. Accordingly, an effect is obtained whereby the reliability of pedestrian recognition in the pedestrian recognition device is further improved, thereby preventing pedestrian recognition errors in the pedestrian recognition device.

According to the vehicle environment monitoring device of the seventh or eighth aspects of the invention, by a process in which the feature quantity comparison device compares the height of a binarized object and the height of a grayscale object, the body state determination device can execute accurate body state determination when the two infrared cameras are arranged side by side. Furthermore, by a process in which the feature quantity comparison device compares the width of a binarized object and the width of a grayscale object, the body state determination device can execute accurate body state determination when the two infrared cameras are arranged vertically. Accordingly, by selecting the optimum feature quantity of a comparison object in the feature quantity comparison device based on how the infrared cameras are arranged, an effect is obtained whereby a vehicle environment monitoring device can be realized which is compatible with any infrared camera arrangement.

According to the vehicle environment monitoring device of the ninth aspect of the invention, it is possible to determine the state of a body, for example whether the body is affected by rain or whether the camera lens is dirty, from the image itself. Accordingly, because the state of a body can be determined without relying on wiper operation signals or detected signals of a raindrop sensor, there is no need to provide the sensors and the like required by these systems, which has an effect whereby the cost is lowered and the reliability of body state determination is improved, and a vehicle environment monitoring device can be realized which can determine the state of a body correctly. Furthermore, because the state of a body is determined by comparing a feature quantity, for example the area, of each binarized object binarized using different luminance threshold values, or by comparing a feature quantity, for example the area, height or width, of a circumscribed quadrangle corresponding to the binarized object, there is no need to execute processing for searching the grayscale image, and this reduces the processing time.

According to the vehicle environment monitoring device of the tenth aspect of the invention, the resources used for judgment in the body state determination device can be increased, enabling accurate body state determination to be executed based on the additional resources used for judgment in the body state determination device. Accordingly, an effect is obtained whereby the reliability of the body state determination performed by the body state determination device is further improved, and determination errors in the state determination performed by the body state determination device can be prevented.

According to the vehicle environment monitoring device of the eleventh aspect of the invention, the pedestrian recognition device can determine the pedestrian recognition processing method from the image itself and recognize pedestrians only, in a stable manner by changing the pedestrian recognition processing method based on the comparison results of the feature quantity comparison device. Accordingly, because the state of a body can be determined without relying on wiper operation signals or detected signals of a raindrop sensor, there is no need to provide the sensors and the like required by these systems, which has an effect whereby the cost is lowered, the reliability of pedestrian recognition is improved, and a vehicle environment monitoring device can be realized which can recognize pedestrians only, in a stable manner. Furthermore, because the state of a body is determined by comparing a feature quantity, for example the area, of a binarized object binarized using different luminance threshold values, or by comparing a feature quantity, for example the area, height or width of a circumscribed quadrangle corresponding to the binarized object, there is no need to execute processing for searching the grayscale image, and this reduces the processing time.

According to the vehicle environment monitoring device of the twelfth aspect of the invention, the resources used for judgment in the pedestrian recognition device are increased, enabling accurate pedestrian recognition to be executed based on the additional resources used for judgment in the pedestrian recognition device. Accordingly, an effect is obtained whereby the reliability of pedestrian recognition in the pedestrian recognition device is further improved, thereby preventing pedestrian recognition errors in the pedestrian recognition device.

DETAILED DESCRIPTION OF THE INVENTION

As follows is a description of embodiments of the present invention with reference to the drawings.

First Embodiment

Overall Construction

Figure 1:
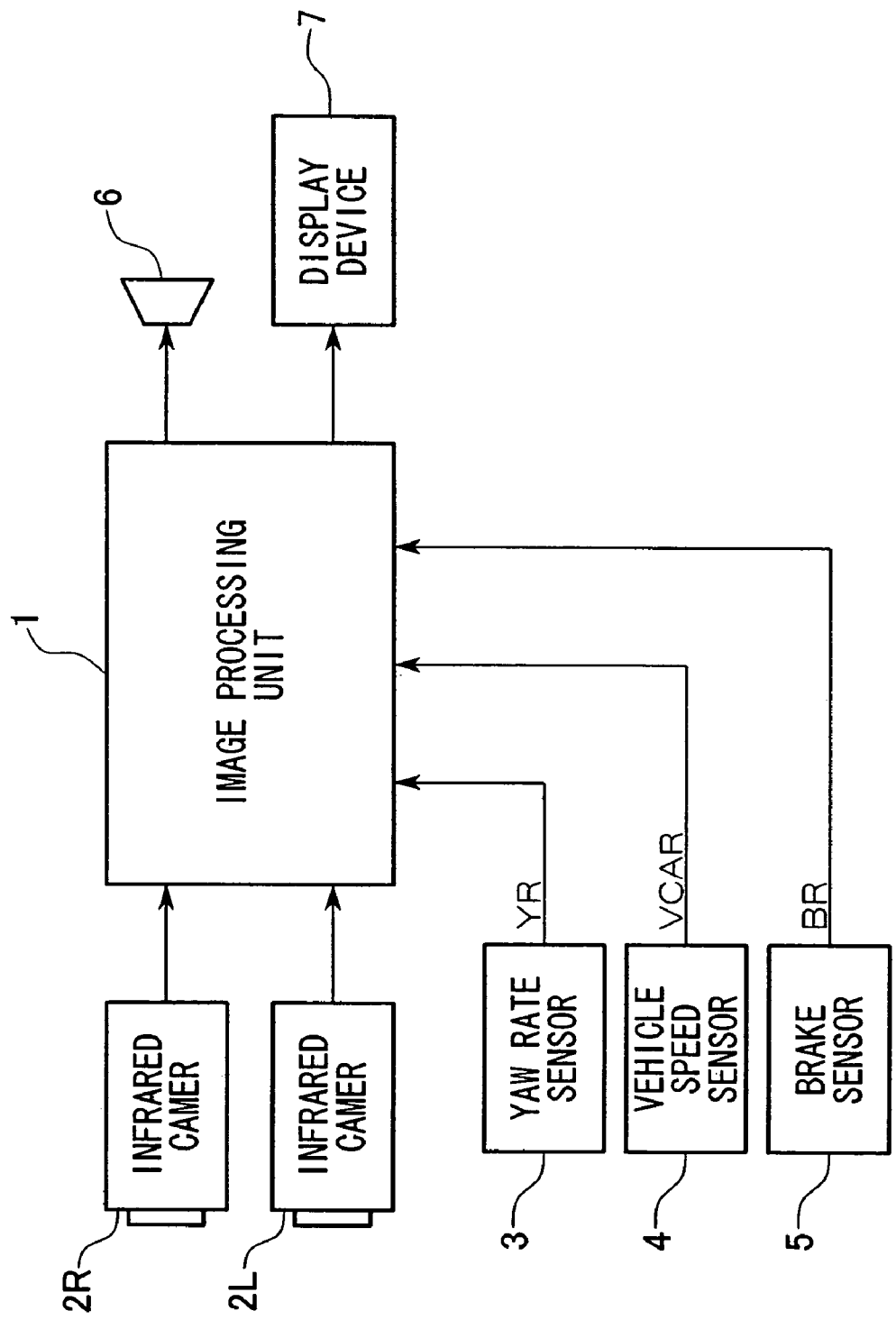
FIG. 1 is a block diagram showing the construction of a vehicle environment monitoring device according to a first embodiment of the present invention.

FIG. 1 is a block diagram showing the construction of a vehicle environment monitoring device according to a first embodiment of the present invention.

In FIG. 1, reference numeral 1 indicates an image processing unit comprising a CPU (central processing unit) which controls the vehicle environment monitoring device of the present embodiment, connected to two infrared cameras 2R, 2L which can detect far infrared radiation, a yaw rate sensor 3 which detects the yaw rate of the vehicle, a vehicle speed sensor 4 which detects the traveling speed of the vehicle (vehicle speed), and a brake sensor 5 which detects operation of the brakes. Accordingly, the image processing unit 1 detects moving bodies such as pedestrians or animals in front of the vehicle from infrared images of the environment of the vehicle and signals indicating the traveling state of the vehicle, and emits a warning when a determination is made that a collision is likely.

Furthermore, the image-processing unit 1 further comprises a speaker 6 which emits a warning by voice, and some type of display device 7 for displaying images captured by the infrared cameras 2R and 2L and for making the driver of the vehicle aware of objects with which there is a high danger of collision, for example a meter integrated display device, in which the meter represents the traveling state of the present vehicle numerically, a NAVI-Display provided on the console of the present vehicle, or a HUD (Heads Up Display) 7a for displaying information mounted behind the front windshield at a position where the front view of the driver is not disturbed.

The image processing unit 1 further comprises an A/D converter which converts input analog signals to digital signals, an image memory which stores digitized image signals, a CPU (central processing unit) which executes various arithmetic processing, a RAM (Random Access Memory) which stores data used for arithmetic processing, a ROM (Read Only Memory) which stores programs, tables, maps and the like which are executed by the CPU, and an output circuit which outputs drive signals for the speaker 6 and display signals for the display device 7. The image-processing unit 1 is constructed such that the output signals of the infrared cameras 2R and 2L, the yaw rate sensor 3, the vehicle speed sensor 4, and the brake sensor 5 are input into the CPU after conversion to digital signals.

Figure 2:
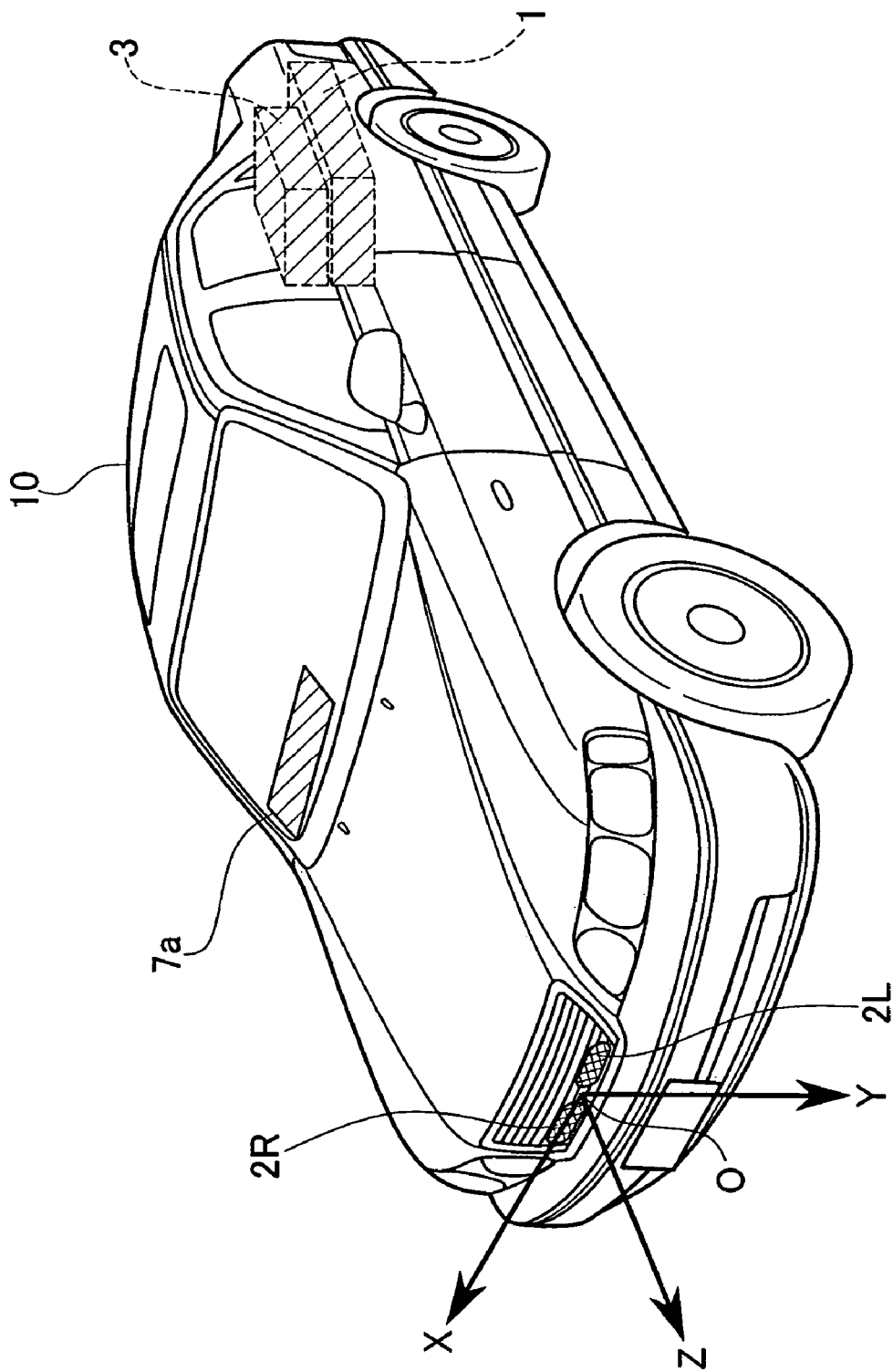
FIG. 2 is a diagram showing the installation positions of infrared cameras, sensors and displays and the like on the vehicle in the first embodiment.

Furthermore, as shown in FIG. 2, two infrared cameras 2R and 2L are disposed at the front of the vehicle 10 at positions symmetrical relative to the central axis of the vehicle 10 in the width direction. The optical axes of both cameras 2R and 2L are parallel to each other, and both infrared cameras 2R and 2L are secured at the same height from the road surface. A characteristic of the infrared cameras 2R and 2L is that the output signal level (luminance) increases as the temperature of the object increases.

Moreover, the HUD 7a is disposed so as to display the images at a position on the front window of the vehicle 10 where the field of front vision of the driver is not impaired.

Next, the operation of this embodiment will be described with reference to the drawings.

Object Detection/Alarm Operation

Figure 3:
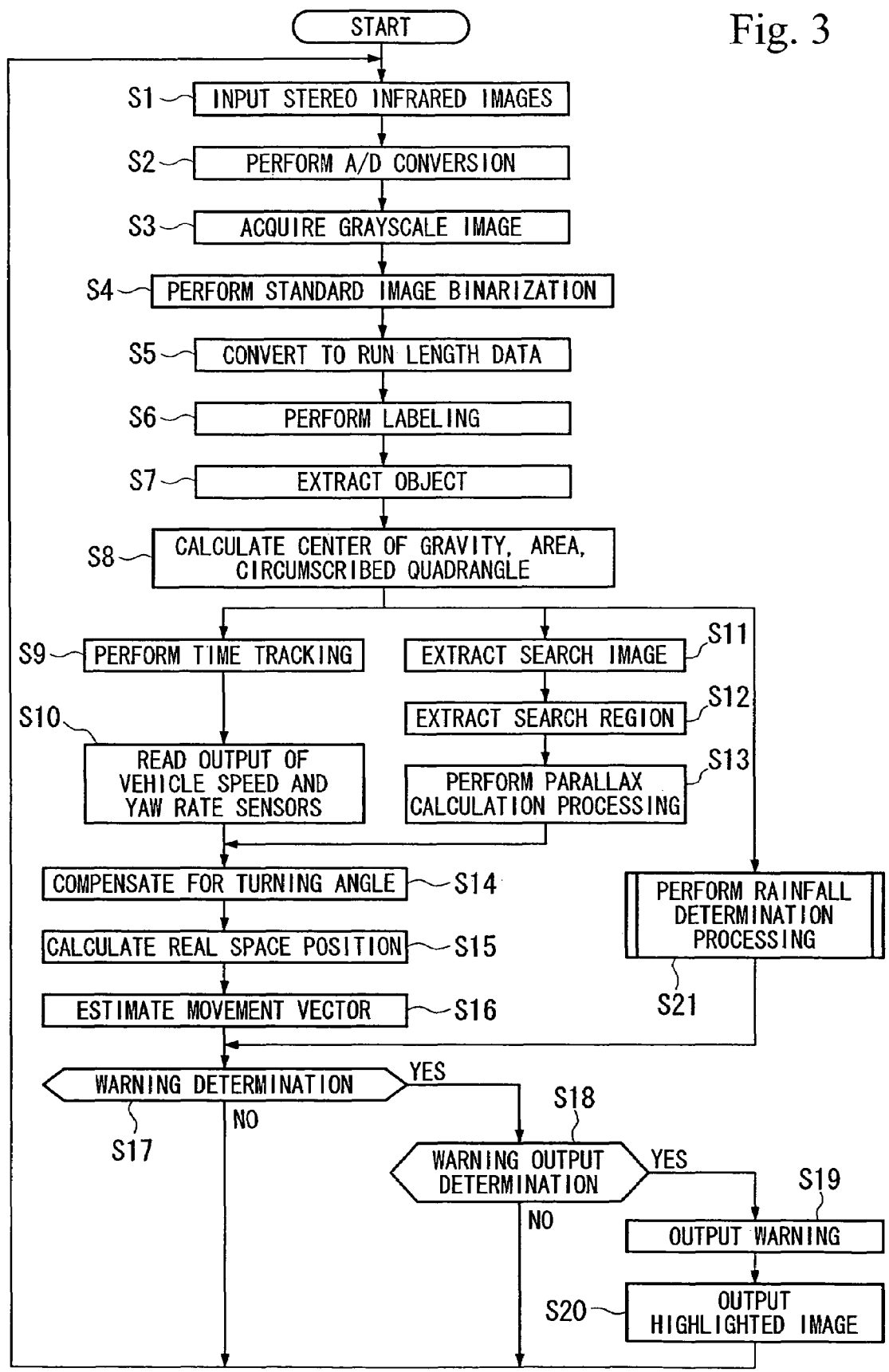
FIG. 3 is a flowchart showing the object detection and warning operations in the vehicle environment monitoring device of the first embodiment.

FIG. 3 is a flowchart showing the operations for detecting objects such as pedestrians and generating an alarm in the image processing unit 1 of the vehicle environment monitoring device of the present embodiment.

In FIG. 3, first, the image processing unit 1 acquires the infrared images as the output signals of the infrared cameras 2R and 2L (step S1), performs A/D conversion (step S2), and stores the gray scale image in the image memory (step S3). Here the infrared camera 2R acquires the right image and the infrared camera 2L acquires the left image. Furthermore, because in the right image and the left image the same object appears displaced in the horizontal direction on the display screen, this displacement (parallax) enables calculation of the distance to the object.

When the grayscale image is obtained in step S3, the right side image obtained by the infrared camera 2R is assigned as the reference image, and binarization processing of this image signal is performed, that is regions brighter than a luminance threshold value ITH are set to "1" (white) and darker regions to "0" (black) (step S4).

Figure 4A:
FIGS. 4A and 4B are diagrams showing a grayscale image obtained by the infrared camera (4A) and a binarized image of the grayscale image (4B).
Figure 4B:
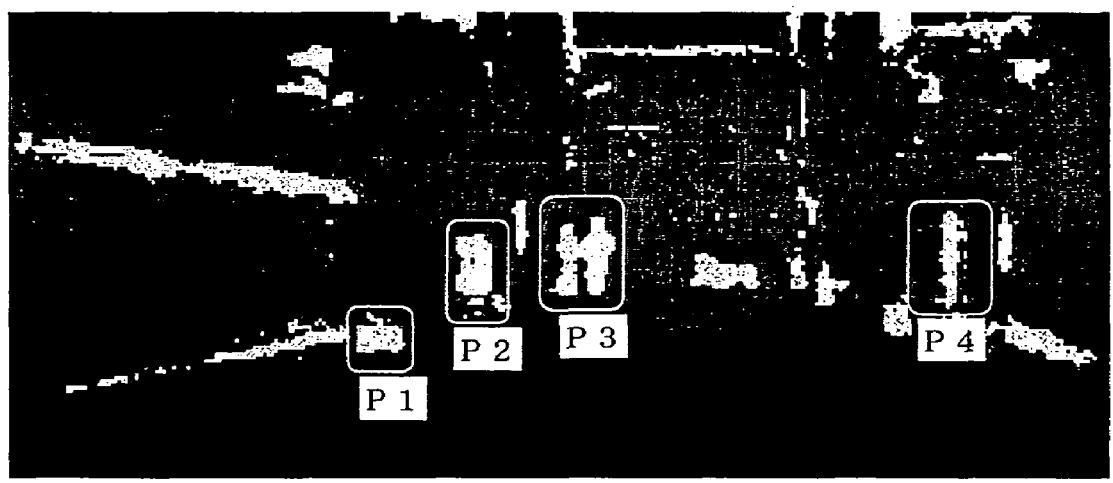

FIG. 4A shows a grayscale image obtained by the infrared camera 2R. When the image is binarized, the image shown in FIG. 4B is obtained. The bodies enclosed by the frames P1 through P4 in FIG. 4B are assigned as objects (hereinafter called "high luminance regions"), which appear white on the display screen.

When the image data binarized from the infrared images is obtained, processing is performed to convert the binarized image data to run length data (step S5). A line of the run length data is formed by showing the white region determined by the binarization processing at the pixel level. That is, the width of each line in the y direction is one pixel, and the length of the run length line in the x direction corresponds to the total length of pixels forming the line.

Next, by labeling objects from the image data converted to run length data (step S6), processing to extract objects is performed (step S7). In other words, by assuming that an object is present where lines of run length data have parts overlapping in the y direction, the high luminance regions P1 through P4 in FIG. 4B can be extracted as objects (binarized objects).

When the binarized object extraction is complete, next the center of gravity G, the area S, and the aspect ratio ASPECT of the circumscribed quadrangles are calculated (step S8).

Here, the areas S are calculated by adding the lengths (run [i]−1) of the run length data (N pieces of run length data) for the same object, assuming that the run length data of the object labeled A is (x [i], y [i], run [i], A) (i=0, 1, 2, . . . , N−1). Furthermore, the coordinates (xc, yc) of the center of gravity G of the object A are calculated by multiplying the length (run [i]−1) of each piece of run length data by the coordinates x [i] or y [i], adding the multiplication products for the same object, and dividing the result by the area S.

In addition, the aspect ratio ASPECT is calculated as the ratio Dy/Dx of the length Dy of the circumscribed quadrangle in the vertical direction to the length Dx in the horizontal direction.

Since the run length data is represented by a number of pixels (number of coordinates) (=run [i]), it is necessary to subtract 1 from the actual length (=run [i]−1). Furthermore, the position of the center of gravity G can be substituted for the center of gravity of the circumscribed quadrangle of the object.

When the center of gravity, the area and the aspect ratio for the circumscribed quadrangle is calculated for the binarized object, time tracking of the object is performed, that is the same object is recognized in each sampling period (step S9). The time tracking is performed to determine whether two bodies A and B extracted at time k, which is an analog time t discrete within a sampling period, are the same as the bodies C and D, which are extracted at the discrete time (k+1). When it is determined that the bodies A and B are the same as the bodies C and D, bodies C and D are relabeled as bodies A and B, and time tracking is performed.

Furthermore, the coordinates (of the center of gravity) for each of the objects traced in this manner are stored in the memory as time series position data, for use in later calculations.

The processing described in steps S4 through S9 above is executed for the binarized reference image (the right image in the present embodiment).

Next, the vehicle speed VCAR detected by the vehicle speed sensor 4 and the yaw rate YR detected by the yaw rate sensor 3 are read, and by taking the time integral of the yaw rate YR, the turning angle θr of the vehicle 10 is calculated (step S10).

On the other hand, in parallel to the processing in step S9 and step S10, processing for calculating the distance z between the object and the vehicle 10 is performed in step S11 through step S13. Because these calculations require more time than those in step S9 and step S10, the calculations are executed based on a longer period than steps S9 and S10 (a period approximately three times longer than the period for steps S1 through S10, for example).

First, one of the objects tracked in the binarized image of the reference image (right side image) is selected and extracted as a search image R1 (here the search image is the entire region enclosed by the circumscribed quadrangle, and the circumscribed quadrangle of the search image is called the object frame) (step S11).

Next, a search region (hereinafter called a "corresponding image") for searching the image corresponding to the search image R1 is set in the left image, and a correlation calculation is executed to extract a corresponding image R4 (step S12).

Specifically, a search region R2 is set in the left image according to the vertex coordinates of the search image R1, a luminance difference summation value C (a, b) which shows the degree of correlation of the search image R1 in the search region R2 is calculated, and the region where this summation value C (a, b) is lowest is extracted as the corresponding image. This correlation calculation is performed using the grayscale image, not the binarized image. If there is historical position data available for the same object, then a region R2a, which is narrower than the search region R2, is set based on this position data.

According to the processing in step S12, a search image R1 is extracted in the reference image (right image) and a corresponding image R4 corresponding to the same object is extracted in the left image, the positions of the centers of gravity of both the search image R1 and the corresponding image R4 and the parallax Δd (number of pixels) are obtained, and the distance z between the vehicle 10 and the object is calculated (step S13).

Furthermore, when the calculation of the turning angle θr in step S10 and the calculation of the distance z to the object are completed, turning angle correction is performed to compensate for the displacement of the object on the screen caused by turning of the vehicle 10 (step S14). This turning angle correction process is to compensate for displacement by Δx in the x direction in the range of the image taken by the camera, when the vehicle 10 turns to the left by an angle of θr within a period from time k to (k+1).

Furthermore, when the turning angle correction is completed, the coordinates in the image (x, y) and the distance z are converted to real space coordinates (X, Y, Z) (step S15).

Here, as shown in FIG. 2, the real space coordinates (X, Y, Z) are defined by appointing the center position of the mounting position of the infrared cameras 2R, 2L (the position secured to the vehicle 10) as the origin O as shown in the figure, and the coordinates in the image are defined as x (the horizontal direction) and y (the vertical direction), with the center of the image as the origin. In the description below the coordinates after turning angle correction are represented as (X, Y, Z).

Next, when turning angle correction of the real coordinates is completed, an approximated straight line LMV, which corresponds to the relative movement vector between the object and the vehicle 10, is determined from N (N=approximately 10, for example) pieces of real space position data, that is time series data, having undergone turning angle correction, obtained for the same object during a monitoring period ΔT.

The most recent coordinates P (0)=(X (0), Y (0), Z (0)) and the coordinates P prior to sampling (prior to time ΔT) (N−1) =(X (N−1), Y (N−1), Z (N−1)) are corrected to the positions on the approximated straight line LMV, and the corrected coordinates Pv (0)=(Xv (0), Yv (0), Zv (0)) and Pv (N−1)= (Xv (N−1), Yv (N−1), Zv (N−1)) are determined.

This procedure obtains the relative movement vector as a vector moving from the coordinates Pv (N−1) towards Pv (0) (step S16).

By determining a relative movement vector by calculating an approximated straight line which approximates the relative movement track of the object relative to the vehicle 10 from a plurality (N) pieces of data obtained within the monitoring period ΔT; it is possible to estimate with better accuracy whether or not there is a possibility of collision with an object, reducing the effect of position detection errors.

Furthermore, after the relative movement vector is obtained in step S16, warning determination processing is performed to determine the possibility of a collision with the detected object (step S17). Details of the warning determination processing are provided below.

When in step S17 it is determined that there is no possibility of a collision between the vehicle 10 and the detected object (NO in step S17), the flow returns to step S1, and the processing described above is repeated.

Furthermore, when in step S17 it is determined that there is a possibility of a collision between the vehicle 10 and the detected object (YES in step S17), the flow proceeds to the warning output determination processing in step S18.

In step S18, by determining from the output BR of the brake sensor 5 whether the driver of the vehicle 10 is operating the brake or not, the warning output processing is performed, that is whether or not to output a warning is determined (step S18).

If the driver of the vehicle 10 is operating the brake, a degree of acceleration Gs (positive in the deceleration direction) generated by the brake operation is calculated, and when this degree of acceleration Gs is above a predetermined threshold GTH, it is determined that the collision can be avoided by the brake operation, and the warning output determination processing terminates (NO in step S18), the flow returns to step S1, and the processing described above is repeated.

It is therefore possible to prevent a warning from being emitted when appropriate brake operation is taking place, thereby avoiding disturbing the driver unnecessarily.

Furthermore, if the degree of acceleration Gs is below the predetermined threshold GTH, or the driver is not operating the brake, the flow proceeds immediately to the processing in step S19 (YES in step S18), and because there is a high likelihood of a collision with the object, an audio alarm is emitted via the speaker 6 (step S19), and, for example, the image obtained by the infrared camera 2R is output, and displayed to the driver of the vehicle 10, emphasizing the approaching object (step S20).

The predetermined threshold value GTH is a value which corresponds to acceleration which would result in the vehicle 10 stopping after a traveling distance less than the distance Zv (0) between the object and the vehicle 10 if the degree of acceleration Gs during the brake operation is maintained.

In the image processing unit 1 of the vehicle environment monitoring device of the present embodiment, rainfall determination processing is performed in parallel with the processing step S9 through step S16 (step S21). This rainfall determination processing determines whether or not bodies in the vehicle environment have been affected by rainfall and become wet, and is used to choose the operation mode of the pedestrian determination processing which is part of the warning determination processing described below. The processing method used for the pedestrian determination processing in the warning determination processing described below is changed according to the operation mode chosen.

The rainfall determination processing, the warning determination processing and the pedestrian determination processing are described in detail below, in that order.

Feature Quantity Calculation Method

Before describing the details of the rainfall determination processing, the warning determination processing and the pedestrian determination processing, first the method of calculating a feature quantity of the binarized object used in the processing, or a feature quantity of an object (grayscale object) in the grayscale image corresponding to the extracted binarized object, is described in concrete terms.

Figure 5:
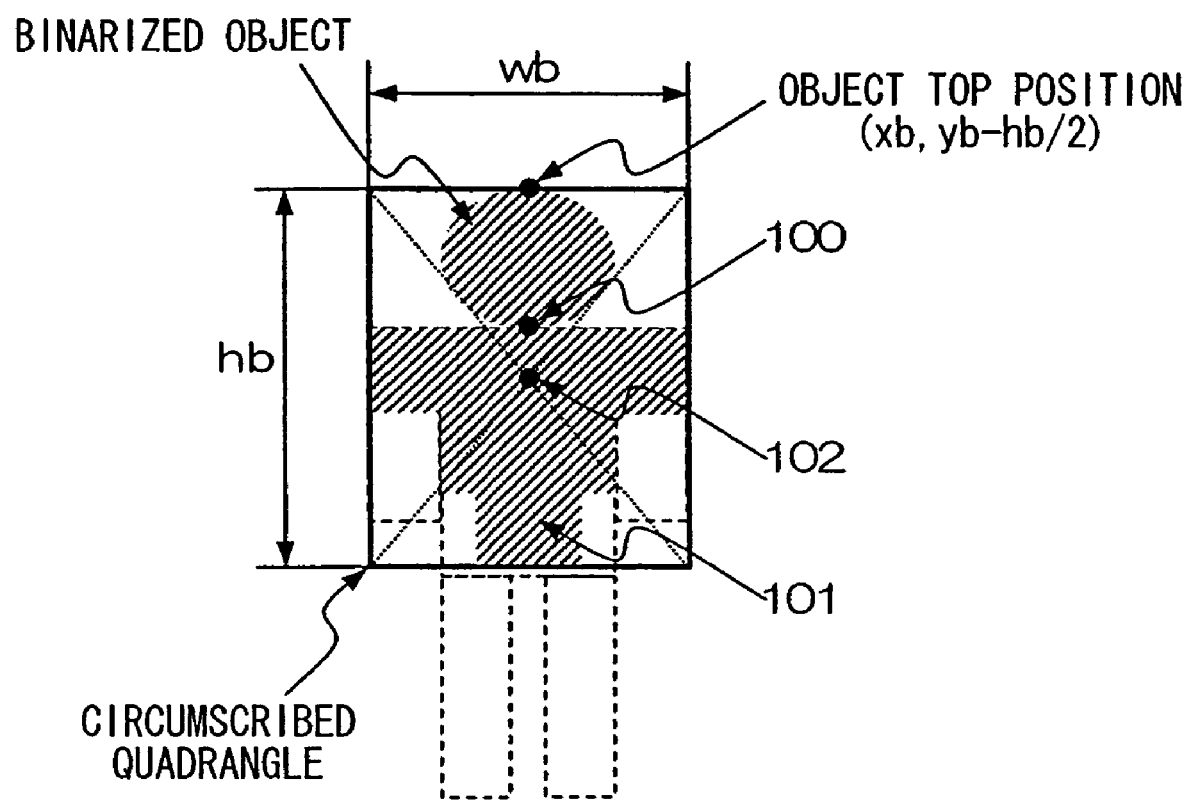
FIG. 5 is a diagram showing the shape feature quantity of a binarized object.

First, the binarized object shape feature quantity which describes the characteristics of the shape of the binarized object in real space is calculated using the center of gravity G (xc, yc) of the binarized object calculated in step S8 in the flowchart shown in FIG. 3 (the center of gravity G100 of the binarized object shown in FIG. 5), the area S (the area S101 of the binarized object shown in FIG. 5), the aspect ratio ASPECT of the circumscribed quadrangle of the object, the distance z between the vehicle 10 and the object calculated in step S13, the values of the height hb and width wb of the circumscribed quadrangle of the binarized object shown in FIG. 5, and the coordinates (xb, yb) of the center of gravity of the circumscribed quadrangle (the center of gravity 102 of the circumscribed quadrangle shown in FIG. 5), as well as the base length D [m] of the camera, the focal distance f [m] of the camera, the pixel pitch p [m/pixel], and the parallax $\Delta d$ [pixel] calculated by a correlation calculation of the left and right images.

Specifically, the ratio Rate of the area of the circumscribed quadrangle to that of the object area is expressed as $$Rate = S/(hb \times wb) \quad (1)$$

Asp which indicates the aspect ratio ASPECT of the circumscribed quadrangle is expressed as $$Asp = hb/wb \quad (2)$$

and the distance z between the vehicle 10 and the object is expressed as $$z = (f \times D)/(\Delta d \times p) \quad (3)$$

and therefore the width $\Delta Wb$ and height $\Delta Hb$ of the binarized object in real space can be calculated as follows:

$$\Delta Wb = wb \times z \times p/f \_\_ \Delta Hb = hb \times z \times p/f \quad (4)$$

the coordinates (Xc, Yc, Zc) of the center of gravity of the binarized object can be calculated as follows:

$$Xc = xc \times z \times p/f$$

$$Yc = yc \times z \times p/f$$

$$Zc = z \quad (5)$$

the coordinates (Xb, Yb, Zb) of the center of gravity of the circumscribed quadrangle of the object can be calculated as follows:

$$Xb = xb \times z \times p/f$$

$$Yb = yb \times z \times p/f$$

$$Zb = z \quad (6)$$

and the coordinates (Xt, Yt, Zt) of the top position of the binarized object can be calculated as follows:

$$Xt = xb \times z \times p/f$$

$$Yt = yb \times z \times p/f - \Delta Hb/2$$

$$Zt = z \quad (7)$$

Furthermore, height, which is one feature quantity of the grayscale image, is calculated in the manner described below.

Figure 6:
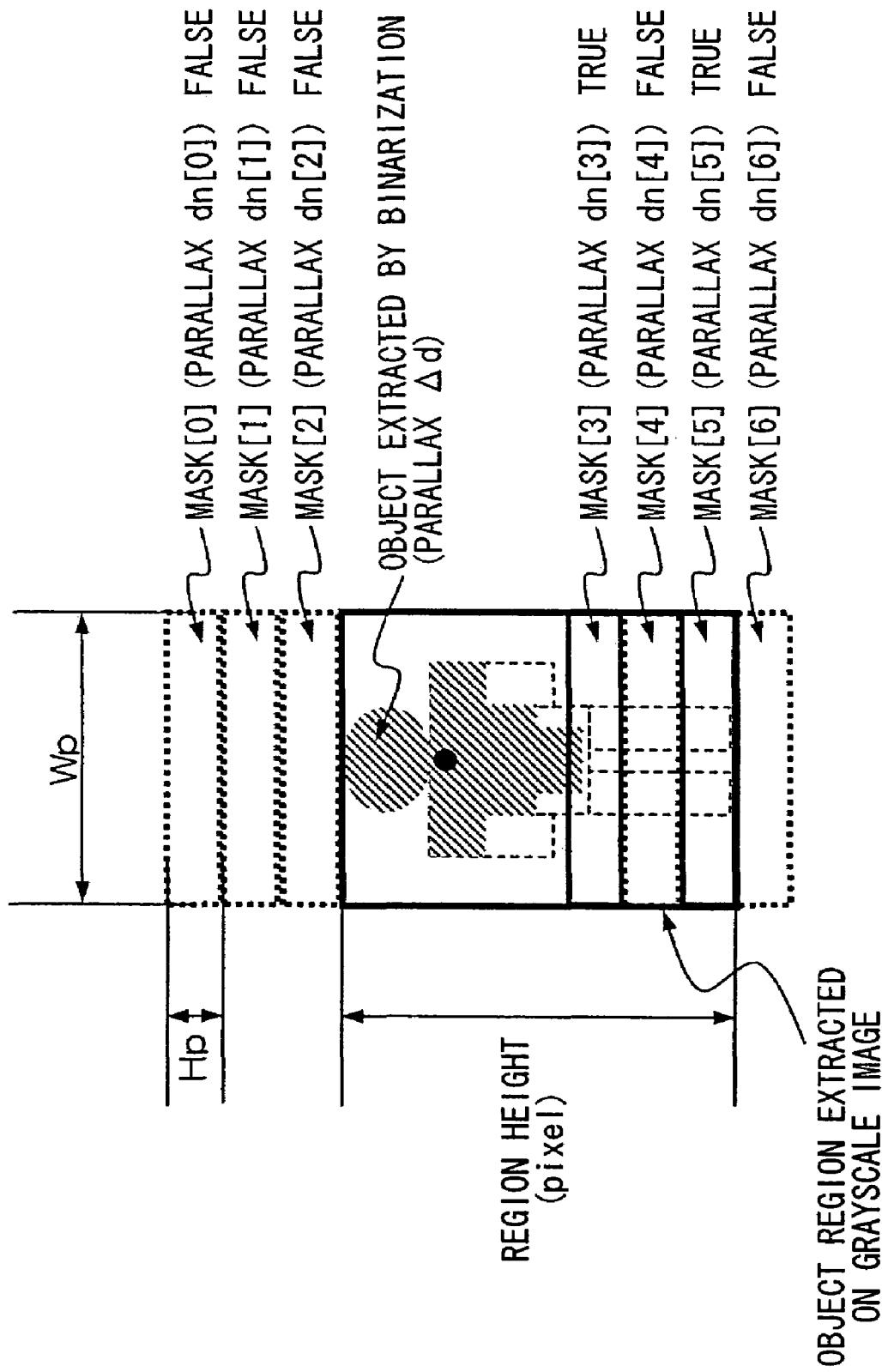
FIG. 6 is a diagram showing a method of extracting a grayscale object and a feature quantity of the grayscale object.

Specifically, as shown in FIG. 6, a plurality of rectangular mask regions (named MASK [I], where I=0, 1, 2, . . . ) where the size in real space is W [m]×H [m] and the mask region size on the screen is Wp [pixel]×Hp [pixel] are set in a row from the top of the circumscribed quadrangle of the binarized object in the grayscale image obtained in step S3, and the region which contains the mask regions which satisfy the conditions 1 through 3 described below (the mask regions determined as TRUE in FIG. 6, for example) is extracted as the region of the grayscale object.

Condition 1: there is a large amount of luminance variation within the mask region (the region contains both an object and background image).

Condition 2: there is a high degree of correlation in the mask region between the left and right images (there is not more than one object within the mask region).

Condition 3: the distance (parallax) is the same as to the binarized object.

The height on the screen Height (pixel) of the region of the grayscale object is calculated, and the height $\Delta Hg$ of the grayscale object is then calculated using equation (8) below.

$$\Delta Hg = z \times Height \times p/f \quad (8)$$

Rainfall Determination Processing

Next, the rainfall determination processing in step S21 of the flowchart shown in FIG. 3 is described in further detail with reference to the flowcharts shown in FIG. 7 and FIG. 8. These flowcharts show the operation of the rainfall determination processing in the present embodiment, indicating the steps involved in determining the presence of rainfall for a plurality of image frames, and choosing the operation mode of the pedestrian determination processing based on the results gathered by this process.

Figure 7:
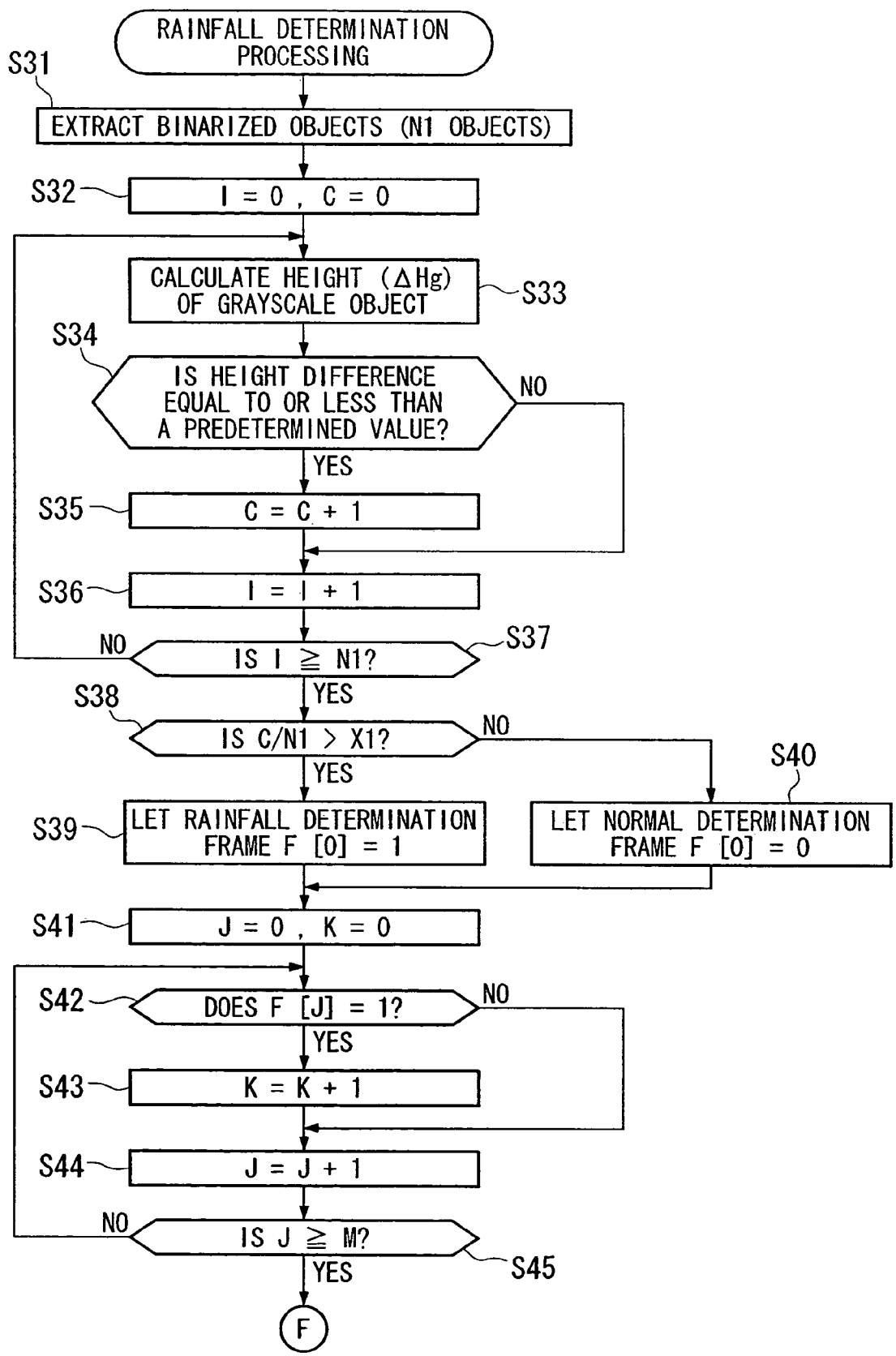
FIG. 7 is a flowchart showing steps S31-S45 of the rainfall determination processing in the first embodiment.

In FIG. 7, first the image processing unit 1 extracts an arbitrary N1 binarized objects (where N1 is an integer, for example every body on the screen) from a single frame (step S31).

Next, the variable I and the variable C are reset to "zero" (step S32).

The height of the grayscale object corresponding to one of the binarized objects extracted by the method outlined above is then calculated (step S33).

Next, it is determined whether the absolute value of the difference between the height ΔHg of the grayscale object and the height ΔHb of the binarized object is smaller than a predetermined value ΔH or not (step S34).

Figure 9:
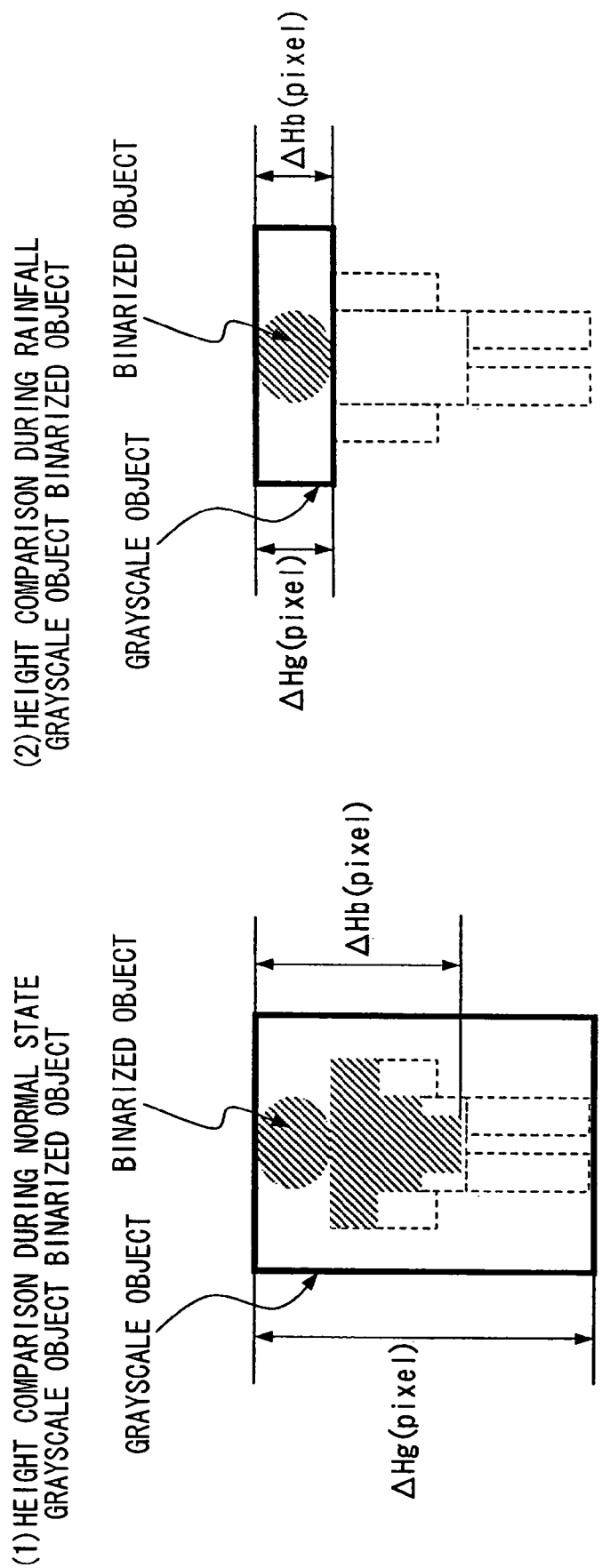
FIG. 9 is a diagram showing the height of the grayscale object and the binarized object in a normal state and a rain-affected state.

In other words, although it is normally possible to distinguish between the height ΔHg of the grayscale object and the height ΔHb of the binarized object as shown in FIG. 9(1), when the image is being affected by rainfall, as shown in FIG. 9(2) the effect on the state of the body caused by raindrops attached to the camera lens, water vapor or raindrops in the air, or wetness, for example, tends to eliminate the difference between the height ΔHg of the grayscale object and the height ΔHb of the binarized object (the grayscale object and the binarized object are equal). Accordingly, by comparing the difference between the height ΔHg of the grayscale object and the height ΔHb of the binarized object to the predetermined value ΔH, it is possible to distinguish between a state in which the vehicle environment and the camera are normal and a state in which the vehicle environment and the camera are being affected by rainfall (including cases where the camera lens is dirty). Alternatively, the value of the height ΔHb of the binarized object may be calculated in the pedestrian determination processing described below, or calculated together with the height of the grayscale object in step S33.

In step S34, if the absolute value |ΔHg−ΔHb| of the difference between the height ΔHg of the grayscale object and the height ΔHb of the binarized object is less than the predetermined value ΔH (YES in step S34), then the image processing unit 1 increments the variable C by 1, and the number of binarized objects for which the absolute value |ΔHg−ΔHb| of the difference between the height ΔHg of the grayscale object and the height ΔHb of the binarized object is smaller than the predetermined value ΔH is counted, as binarized objects which are likely affected by rainfall (step S35).

Next, the variable I is incremented by 1 (step S36).

Furthermore, when in step S34 the absolute value |ΔHg−ΔHb| of the difference between the height ΔHg of the grayscale object and the height ΔHb of the binarized object is greater than or equal to the predetermined value ΔH (NO in step S34), the flow proceeds to step S36, and the image processing unit 1 increments the variable I by 1 (step S36).

It is then determined whether the variable I has met or exceeded the total number N1 of binarized objects or not (step S37), and if the variable I is less than the total number N1 of binarized objects (NO in step S37), the flow returns to step S33, and the image processing unit 1 calculates the height of the grayscale object corresponding to the next extracted binarized object, and repeats the processing described above.

On the other hand, when in step S37 the variable I is greater than or equal to the total number N1 of binarized objects (YES in step S37), a determination is made as to whether the ratio [C/N1] of the variable C to the total number N1 of binarized objects, that is the ratio [C/N1] of the number C of binarized objects for which the absolute value |ΔHg−ΔHb| of the difference between the height ΔHg of the grayscale object and the height ΔHb of the binarized object is smaller than the predetermined value ΔH, to the total number N1 of binarized objects, is greater than a predetermined value X1, or not (step S38).

When in step S38 it is determined that the ratio [C/N1] of the number of binarized objects C where the absolute value of the height difference is less than the predetermined value ΔH, to the total number N1 of binarized objects, is greater than the predetermined value X1 (YES in step S38), the image frame in question is determined to be rainfall-affected, and the flag F [0] which represents the state of the most recent image frame is set to [1] (step S39).

On the other hand, when in step S38 it is determined that the ratio [C/N1] of the number of binarized objects C where the absolute value of the height difference is less than the predetermined value ΔH, to the total number of binarized objects N1, is less than or equal to the predetermined value X1 (NO in step S38), then the image frame in question is determined to be a normal frame, and the flag F [0] which represents the state of the most recent image frame is set to [0] (step S40).

The processing in step S31 through step S40 above applies to a single frame. Next, in order to gather information on whether past image frames were rain-affected or normal for a plurality of frames, the image processing unit 1 resets the variables J and K to "zero" (step S41).

It is then determined whether the flag F [J] which indicates the state of the image frame specified by the variable J is "1" or not (step S42).

When in step S42 the flag F [J] which indicates the state of the image frame specified by the variable J is "1" (YES in step S42), the image processing unit 1 increments the variable K by "1" (step S43).

Next, the variable J is incremented by "1" (step S44).

Furthermore, when in step S42 the flag F [J] which indicates the state of the image frame specified by the variable J is "0" (NO in step S42), the flow proceeds to step S44, and the image processing unit 1 increments only the variable J by "1" (step S44).

A determination is then made as to whether or not the variable J has equaled or exceeded the predetermined value M which indicates the total number of image frames for determination (step S45), and when the variable J is less than the predetermined value M which indicates the total number of image frames for determination (NO in step S45), the flow returns to step S42, and the image processing unit 1 performs the determination on the flag F [J] which indicates the state of the next image frame specified by the variable J, and the processing described above is repeated.

Figure 8:
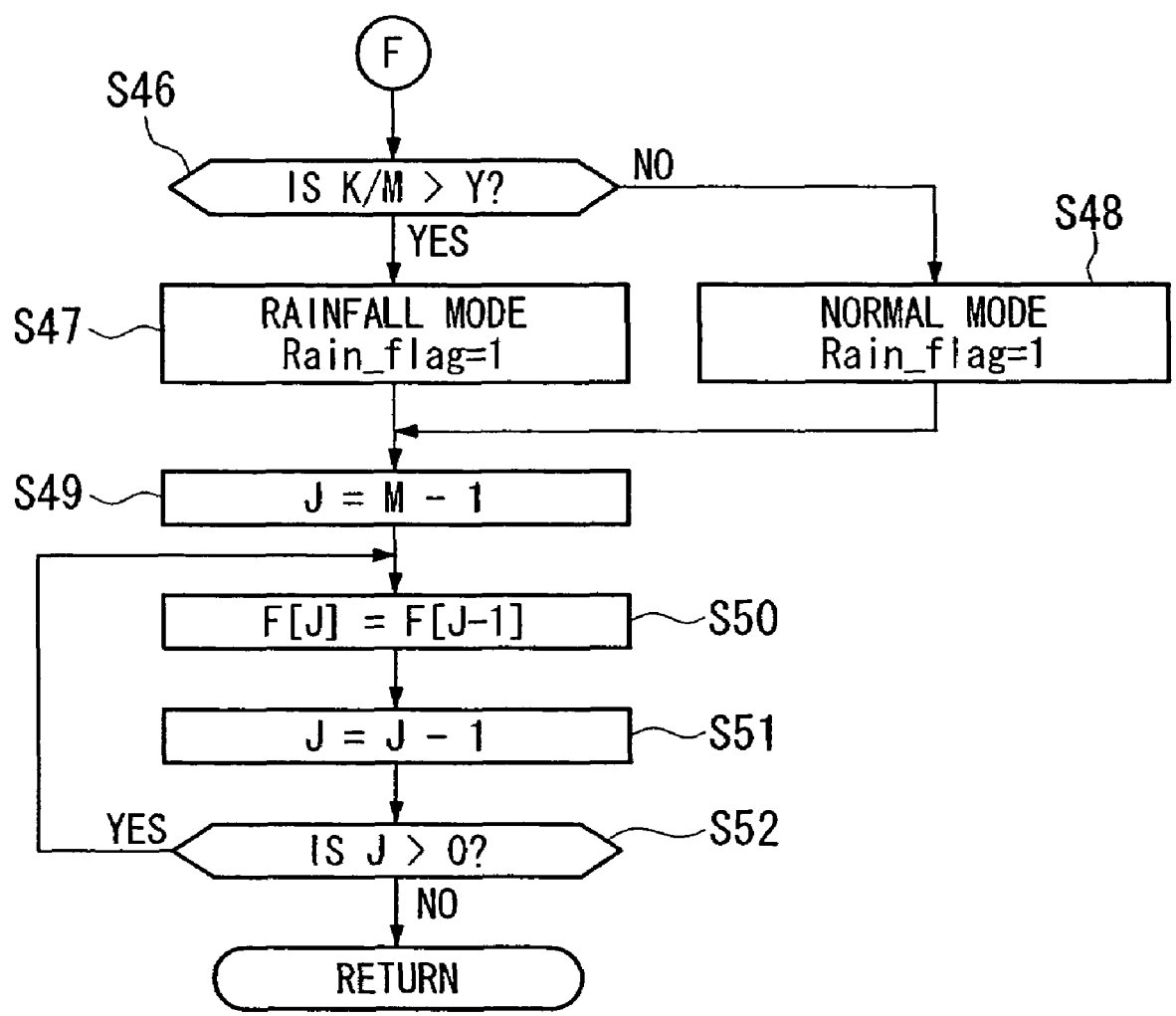
FIG. 8 is a flowchart showing steps S46-S52 of the rainfall determination processing in the first embodiment.

On the other hand, when in step S45 the variable J has equaled or exceeded the predetermined value M which indicates the total number of image frames for determination (YES in step S45), the image processing unit 1 proceeds to step S46 in FIG. 8, and a determination is made as to whether or not the ratio [K/M] of the variable K to the total number of image frames M, that is the ratio [K/M] of the number K of image frames determined to be rainfall-affected to the total number of image frames M, is greater than a predetermined value Y (step S46).

If in step S46 the ratio [K/M] of the number of image frames determined to be rain-affected K to the total number of image frames M is greater than the predetermined value Y (YES in step S46), the operation mode of the pedestrian determination processing is determined to be rainfall mode, and the flag "Rain_flag" which indicates the operation mode of the pedestrian determination processing is set to "1" (step S47).

On the other hand, if in step S46 the proportion [K/M] of the number of image frames determined to be rainfall-affected K to the total number of image frames M is less than or equal to the predetermined value Y (NO in step S46), the operation mode of the pedestrian determination processing is determined to be normal mode, and the flag "Rain_flag"

which indicates the operation mode of the pedestrian determination processing is set to "0" (step S48).

After rainfall determination is performed for a plurality of image frames as described above and the operation mode of the pedestrian determination processing is chosen based on the gathered results of this rainfall determination, the image processing unit 1 then sets the variable J to a value one less than the total number of image frames M (step S49), copies the contents of the flag F [J−1] to the flag F [J] which indicates the state of the image frame specified by the variable J (step S50), and decrements the variable J by "1" (step S51).

It is then determined whether the variable J is greater than "0" or not (step S52), and if the variable J is greater than "0" (YES in step S52), the flow returns to step S50, and the processing described above is repeated.

On the other hand, if in step S52 the variable J is less than or equal to "0" (NO in step S52), the rainfall determination processing is terminated. In other words, by the processing in step S49 through step S52, the contents of the flags which indicate the state of the image frames are shifted one by one until the flag F [0] which indicates the state of the most recent image frame is empty.

Alternative Mode of Rainfall Determination Processing in the First Embodiment

In the processing step S31 through step S52 shown in FIG. 7 and FIG. 8, steps were described in which in order to improve the robustness of the system, rainfall determination is performed for a plurality of image frames, and the operation mode of the pedestrian determination processing is chosen based on the gathered results. However, to simplify the steps in the processing, the operation mode of the rainfall determination processing may be chosen based on the results from a single image frame instead of using gathered results for a plurality of image frames. Specifically, if in step S38 shown in FIG. 7 the ratio [C/N1] of the variable C to the total number N1 of binarized objects, that is the ratio [C/N1] of the number of binarized objects C where the absolute value of the height difference is less than the predetermined value ΔH, to the total number N1 of binarized objects, is greater than the predetermined value X1 (YES in step S38), the image processing unit 1 proceeds to step S47, determines that the operation mode of the pedestrian determination processing should be rainfall mode, and sets the flag "Rain_flag" which indicates the operation mode of the pedestrian determination processing to "1".

Also in step S38, if the ratio [C/N1] of the number of binarized objects C where the absolute value of the height difference is less than the predetermined value ΔH, to the total number N1 of binarized objects, is less than or equal to the predetermined value X1 (NO in step S38), the image processing unit 1 proceeds to step S48, and determines that the operation mode of the pedestrian determination processing should be normal mode, and sets the flag "Rain_flag" which indicates the operation mode of the pedestrian determination processing to "0".

If the results of determining the state of a single image frame are used to set the operation mode of the pedestrian determination processing instead of using gathered results for a plurality of image frames, there is no need to execute the subsequent processing for gathering the determination contents of the plurality of image frames, executed in step S39 through step S46 and step S49 through step S52.

Warning Determination Processing

Next, the warning determination processing in step S17 in FIG. 3 is described in further detail with reference to the flowchart shown in FIG. 10.

Figure 10:
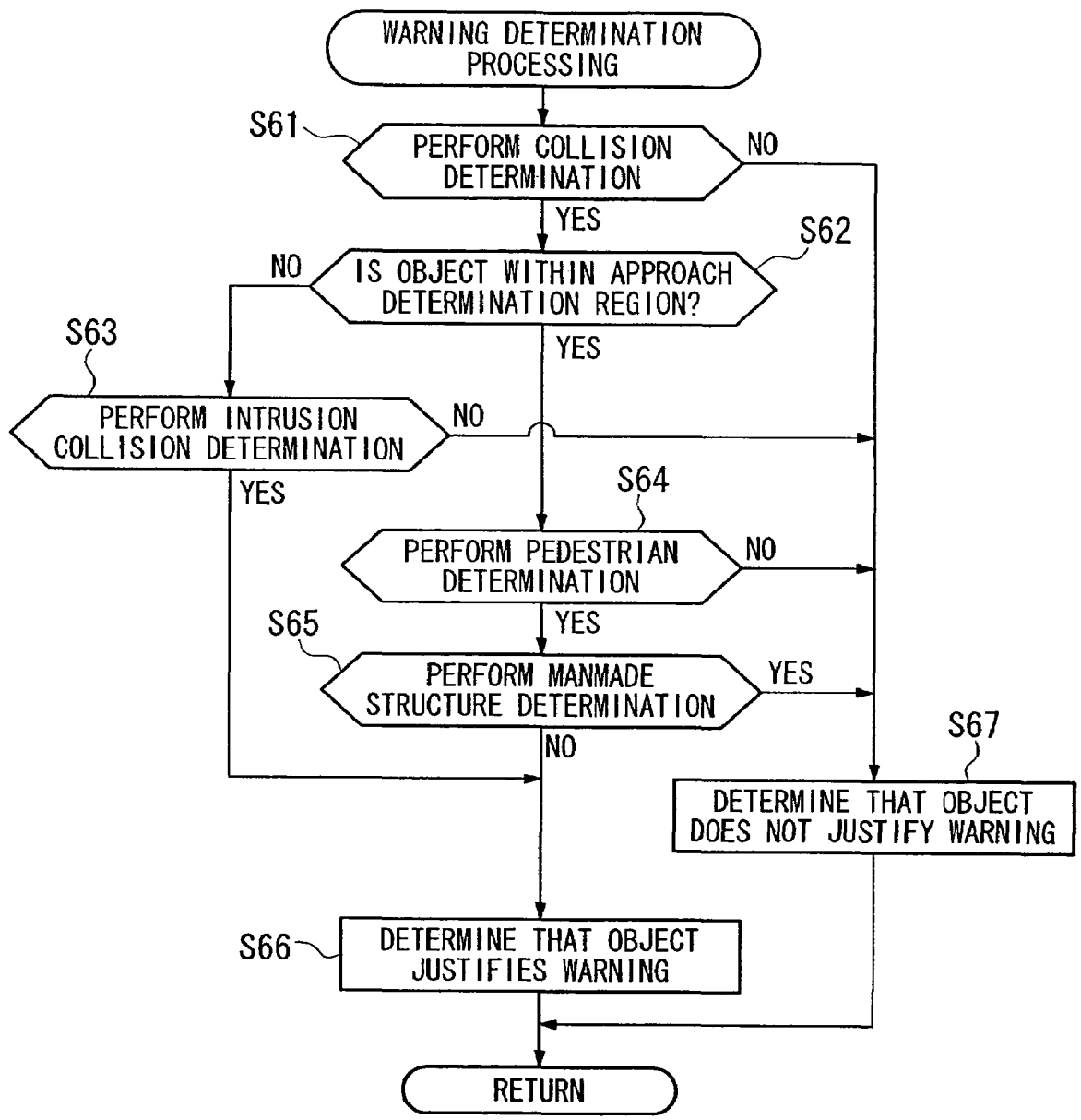
FIG. 10 is a flowchart showing the warning determination processing in the first embodiment.

FIG. 10 is a flowchart showing the operation of the warning determination processing of the present embodiment.

Figure 11:
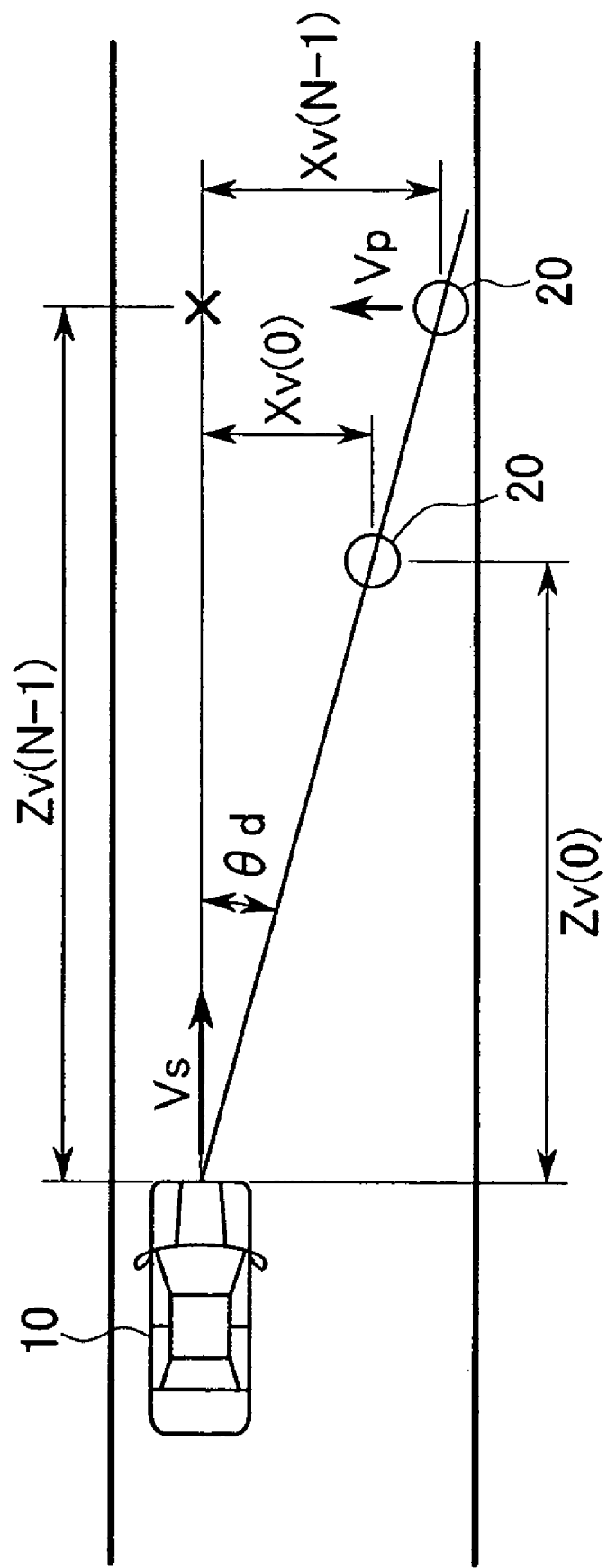
FIG. 11 is a diagram showing a case in which a collision is likely to occur.

This warning determination processing determines the possibility of a collision between the vehicle 10 and a detected object based on the collision determination processing, processing to determine whether or not an object is in an approach determination region, intrusion collision determination processing, pedestrian determination processing, and manmade structure determination processing, which are described below. The description below uses an example as shown in FIG. 11, in which an object 20 is traveling towards the vehicle at a velocity Vp from a substantially 90° angle relative to the traveling direction of the vehicle 10.

In FIG. 10, first the image processing unit 1 performs collision determination processing (step S61). This collision determination processing calculates the relative velocity of the vehicle 10 and the object 20 in the Z direction when, as in FIG. 11, the object 20 approaches from a distance of Zv (N−1) to a distance of Zv (0) during a time period ΔT, and assuming that the height of both is less than H and the relative velocity Vs is maintained, determines whether or not the two will collide within the remaining time T. Here, the time allowance T is intended to allow determination of the possibility of a collision in advance of the estimated collision time by a length of time T. Accordingly, the time allowance T may be set to approximately 2 to 5 seconds, for example. Furthermore, H is a predetermined height which defines the range of the height direction, and is set to about twice the height of the vehicle 10, for example.

Figure 12:
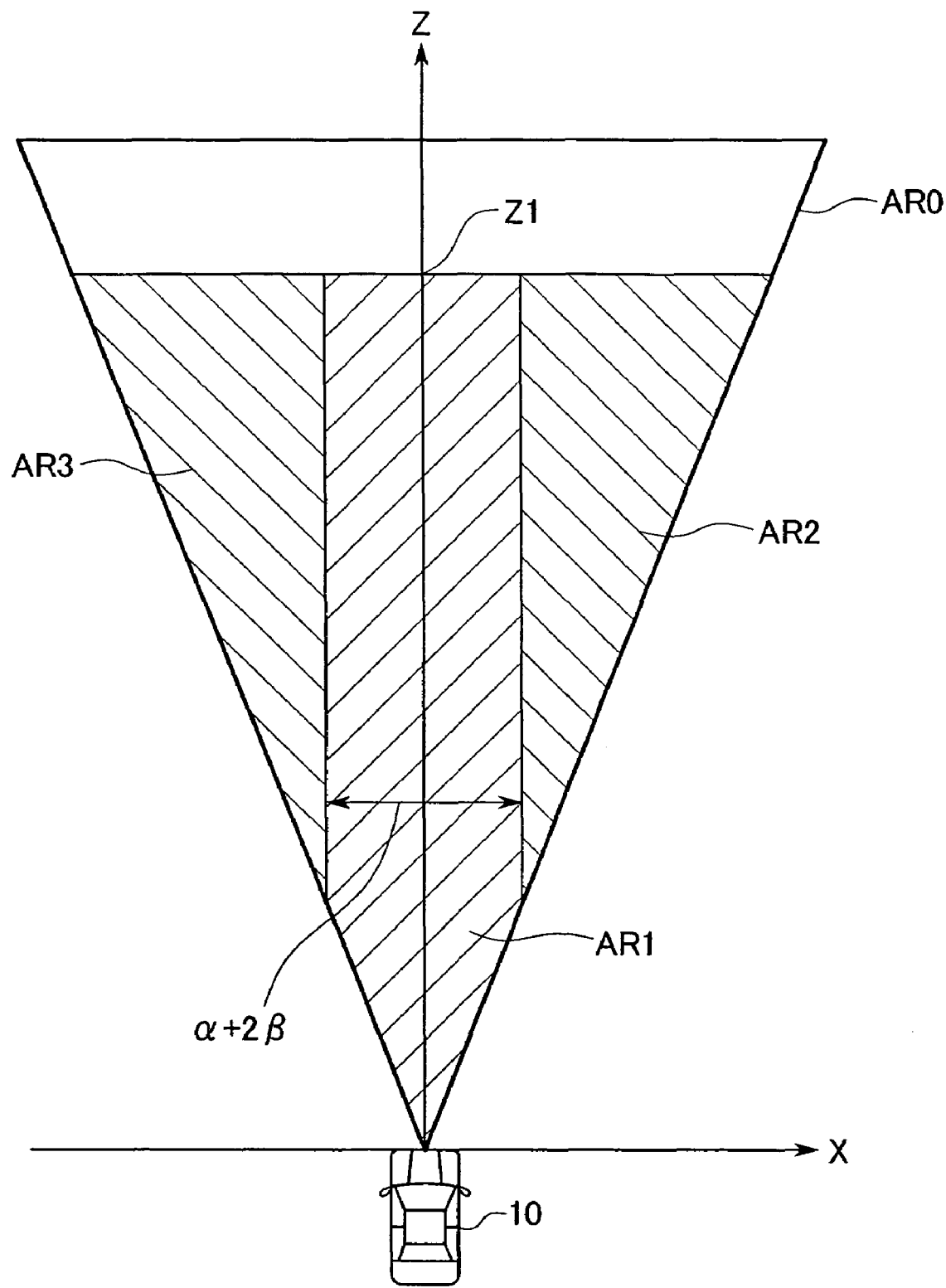
FIG. 12 is a diagram showing the classification of the regions in front of the vehicle.

Next, when in step S61 there is a possibility of a collision between the vehicle 10 and the object within the time allowance T (YES in step S61), in order to further improve the reliability of the determination, the image processing unit 1 determines whether or not the object is within an approach determination region (step S62). In this determination processing for whether or not the object is within an approach determination region, as shown in FIG. 12, a region which can be monitored by the infrared cameras 2R and 2L is defined as the outer triangle region AR0 indicated by the bold solid line, and the processing determines whether or not the object is within a region AR1 inside the region AR0, which closer to the vehicle 10 than Z1=Vs×T, and corresponds to where the object is within a range for where an allowance of β (for example approximately 50 to 100 cm) has been added to both sides of the width α of the vehicle 10, that is an approach determination region AR1 where there is a high likelihood of a collision occurring with the vehicle 10 if the object stays in that location. The approach determination region AR1 also has a predetermined height H.

In addition, when in step S62 the object is not present within the approach determination region (NO in step S62), the image processing unit 1 performs intrusion collision determination processing to determine whether or not there is a possibility of the object entering the approach determination region and colliding with the vehicle 10 (step S63). This intrusion collision determination processing deems the regions AR2 and AR3 the intrusion determination regions, for which the absolute value of the X coordinate is greater than that of the approach determination region AR1 described above (in the outside transverse direction of the approach determination region), and determines whether the objects within these regions will move into the approach determination region AR1 and collide with the vehicle 10 or not. The intrusion determination regions AR2 and AR3 also have the same predetermined height H.

On the other hand, when in step S62 the object is within the approach determination region (YES in step S62), the image processing unit 1 performs pedestrian determination processing to determine whether or not the object may be a pedestrian (step S64). The pedestrian determination processing is described in detail below.

Furthermore, when in step S64 it is determined that the object may be a pedestrian (YES in step S64), in order to further improve the reliability of the determination, manmade structure determination processing is performed to determine whether the object is a manmade structure or not (step S65). This manmade structure determination processing determines that the object is a manmade structure and excludes the object from warning determination if certain characteristics such as those mentioned below are found in the object image, meaning that the object cannot be a pedestrian.

(1) some parts of the image of the object have straight edges
(2) some angles in the image of the object are right angles
(3) the same shape occurs a plurality of times in the image of the object
(4) the image of the object matches a registered shape of a manmade structure.

Accordingly, when in step S63 there is a possibility of the object entering the approach determination region and colliding with the vehicle 10 (YES in step S63) and in step S65 the object determined to possibly be a pedestrian is not a manmade structure (NO in step S65), the image processing unit 1 determines that there is a possibility of the vehicle 10 colliding with the detected object (a warning is justified) (step S66). Since this means that step S17 in FIG. 3 is YES, the flow proceeds to step S18, and warning output determination processing is performed (step S18).

On the other hand, when in step S61 there is no possibility of a collision between the vehicle 10 and the object within the time allowance T (NO in step S61), or in step S63 there is no possibility of the object entering the approach determination region and colliding with the vehicle 10 (NO in step S63), or in step S64 a determination was made that the object cannot be a pedestrian (NO in step S64), or when the object determined to possibly be a pedestrian in step S65 is a manmade structure (YES in step S65), the image processing unit 1 determines that there is no possibility of a collision between the object and the vehicle 10 (a warning is not justified) (step S67). Since this means that step S17 in FIG. 3 is NO, the flow returns to step S1, and the object (such as a pedestrian) detection and warning operations are repeated.

Pedestrian Determination Processing

Next, the pedestrian determination processing in step S64 of the flowchart shown in FIG. 10 is described in further detail with reference to FIG. 13 through FIG. 18. These are flowcharts showing the operation of the pedestrian determination processing of the present embodiment. The processing method of the pedestrian determination processing changes according to the operation mode chosen by the rainfall determination processing.

Figure 13:
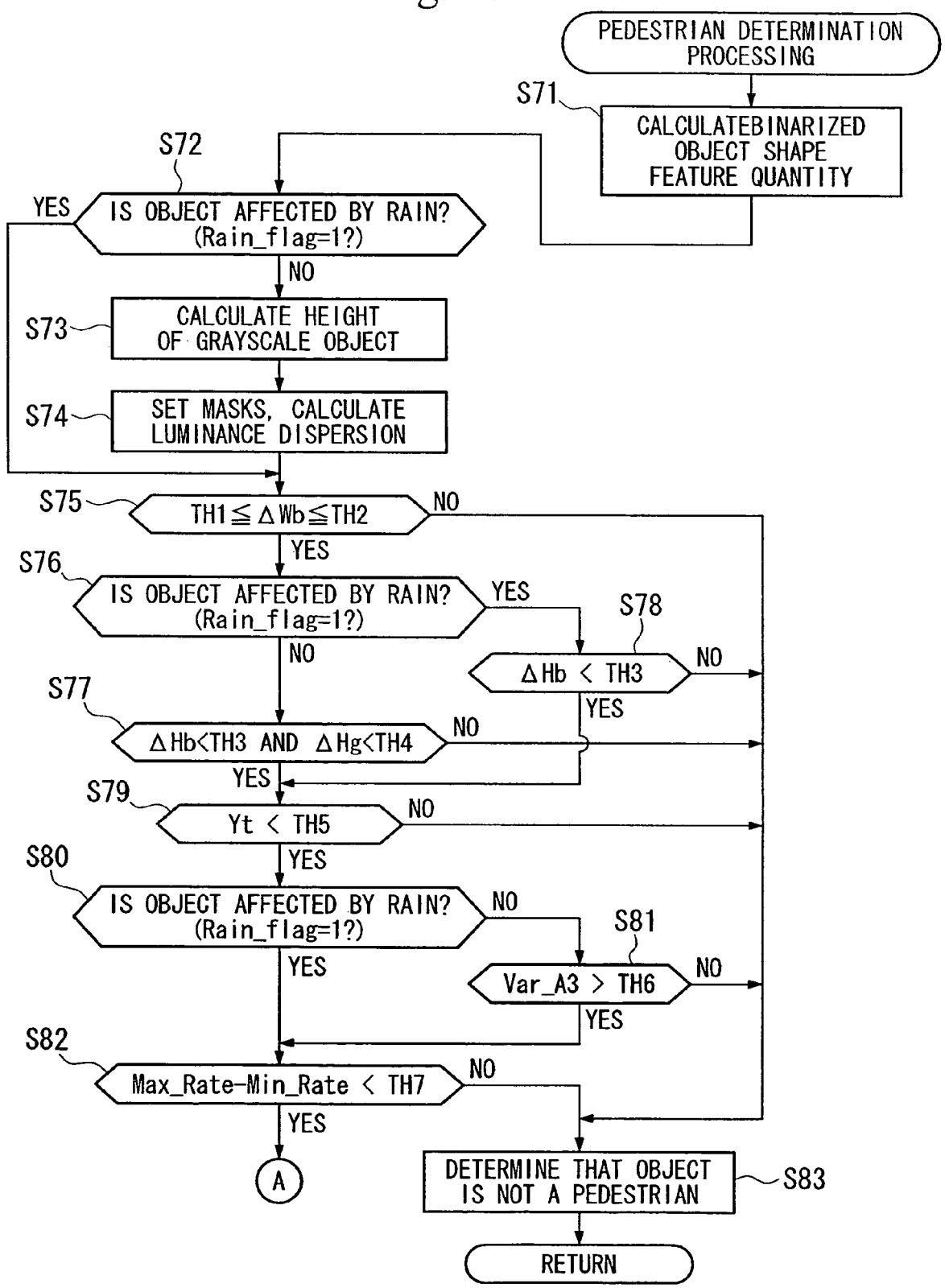
FIG. 13 is a flowchart showing steps S71-S83 of the pedestrian determination processing in the first embodiment.

Specifically, in FIG. 13, first the image processing unit 1 calculates the binarized object shape feature quantity which indicates the characteristics of the shape of the binarized object in real space (step S71).

Furthermore, when the binarized object shape feature quantity is calculated, it is determined whether the environment of the vehicle are in a state of being affected by rainfall or not by determining whether the flag "Rain_flag" is "1" or not (step S72).

When in step S72 the environment of the vehicle 10 are not being affected by rainfall (NO in step S72), the image processing unit 1 calculates the height of the grayscale image which corresponds to the binarized object extracted using the methods described above (step S73).

Figure 19:
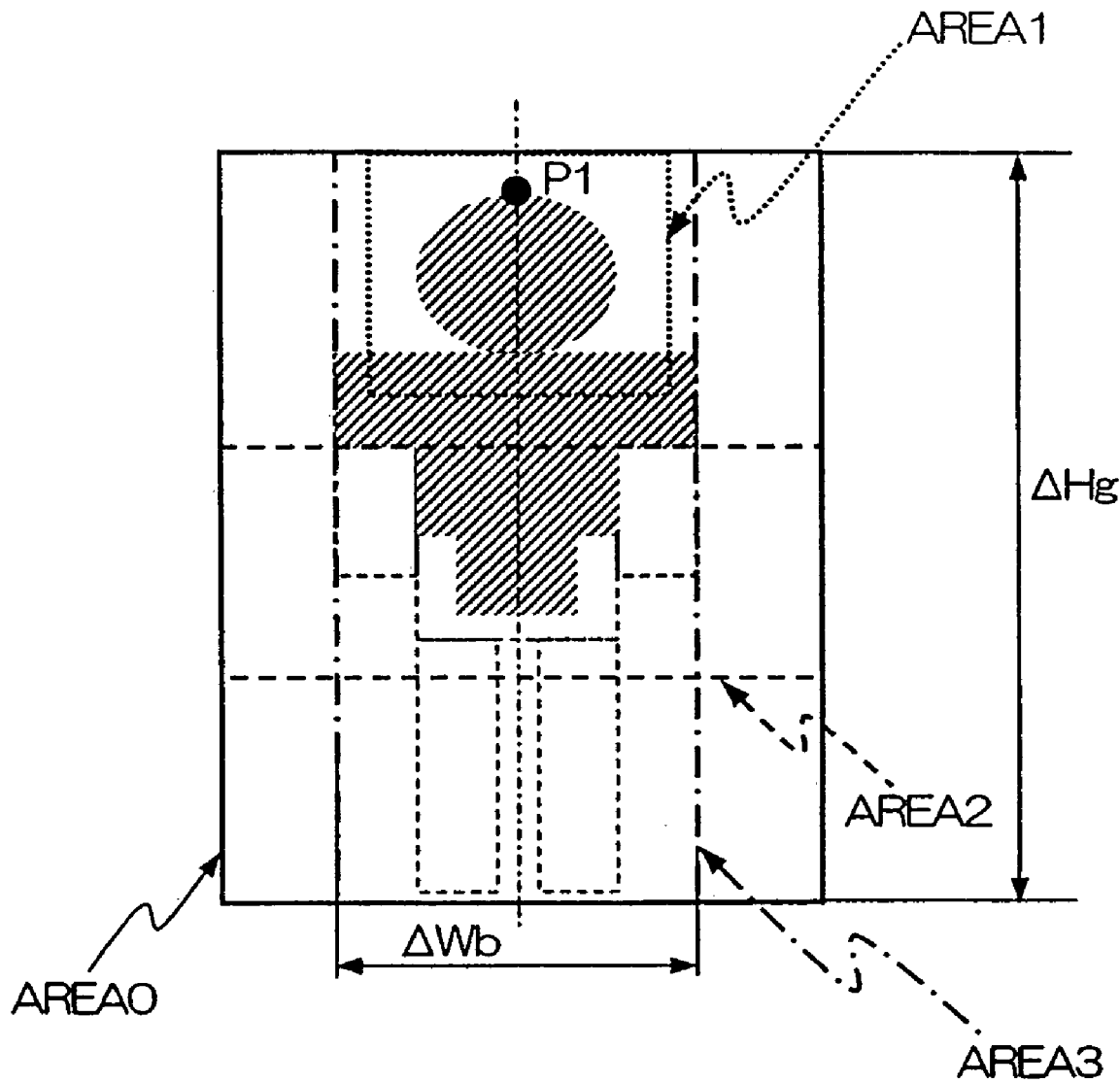
FIG. 19 is a diagram showing the setting of mask regions in the first embodiment.

Furthermore, as shown in FIG. 19, the region which the grayscale object occupies on the screen is deemed AREA0, mask regions AREA1, AREA2 and AREA3 are set within AREA0, and the average luminance and luminance variation (dispersion) are calculated for each mask (step S74). Here, the average luminance of AREA1 is deemed Ave_A1, the luminance dispersion of AREA2 is deemed Var_A2, and the luminance dispersion of AREA3 is deemed Var_A3. In the processing below, AREA1 is used to determine the presence of the head of the object, AREA2 is used to determine the presence of the torso of the object, and AREA3 is used to determine whether there is any change in shape from the head to the lower body. Furthermore, AREA3 is used to identify the object as a pedestrian when part of the object extracted by the binarizing process is a heat reservoir such as a wall which stores heat received from an external source but does not emit heat itself, and shows uniform luminance variation. FIG. 19 shows a pedestrian captured by the cameras in the form of a pattern, wherein the diagonally shaded regions are the parts of the object captured by binarization, and the regions enclosed by the dashed lines are parts of the object which were not captured by binarization but which could be recognized as bodies against the background in the grayscale image. Furthermore, the dimensions of each part shown in FIG. 19 are an example of the dimensions of each part in real space.

When the mask regions AREA1, AREA2 and AREA3 are set, pedestrian determination based on the shape of the binarized object as shown below, and pedestrian determination using the luminance dispersion of each of the mask regions of the grayscale image, are performed.

First, the image processing unit 1 determines whether or not the height, width, presence height, average luminance and luminance dispersion of the binarized object are within a range appropriate for a pedestrian.

Specifically, in order to target pedestrians, whether the width $\Delta Wb$ of the binarized object is above the threshold TH1 and below TH2 (values suitable for a pedestrian) or not is determined (step S75).

Furthermore, when in step S72 the environment of the vehicle are being affected by rainfall (YES in step S72), the calculation of the height of the object on the grayscale image and the setting of the mask regions AREA1, AREA2 and AREA3 in step S73 and step S74 are not performed, the flow proceeds to step S75, and in order to target pedestrians, a determination is made as to whether the width $\Delta Wb$ of the binarized object is above the threshold TH1 and below TH2 or not (step S75).

Furthermore, when in step S75 the width $\Delta Wb$ of the binarized object is greater than or equal to the threshold TH1 and less than or equal to the threshold TH2 (YES in step S75), whether the environment of the vehicle 10 are being affected by rainfall or not is determined by determining whether the flag "Rain_flag" is "1" or not (step S76).

When in step S76 it is determined that the environment of the vehicle 10 are not being affected by rainfall (NO in step S76), a determination is then made as to whether the height $\Delta Hb$ of the binarized object is less than a threshold value TH3 (a value suitable for the height of a pedestrian) and the height $\Delta Hg$ of the grayscale object is less than a threshold value TH4 (a value appropriate for the height of a pedestrian) or not (step S77).

On the other hand, when in step S76 it is determined that the environment of the vehicle 10 are being affected by rainfall (YES in step S76), a determination is then made as to whether the height ΔHb of the binarized object is less than a threshold value TH3 (a value appropriate for the height of a pedestrian) or not (step S78).

When in step S77 the height ΔHb of the binarized object is less than the threshold value TH3 (a value appropriate for the height of a pedestrian) and the height ΔHg of the grayscale object is less than the threshold value TH4 (YES in step S77), or in step S78 the height ΔHb of the binarized object is less than the threshold value TH3 (YES in step S78), a determination is then made as to whether the highest position Yt of the object from the road surface is less than a threshold value TH5 (a value appropriate for the height of a pedestrian) or not (step S79).

Furthermore, when in step S79 the highest position Yt of the object from the road surface is less than a threshold value TH5 (YES in step S79), a determination is made as to whether the environment of the vehicle 10 are being affected by rainfall or not by determining whether the flag "Rain_flag" is "1" or not (step S80).

When in step S80 it is determined that the environment of the vehicle 10 are not being affected by rainfall (NO in step S80), a determination is made as to whether the luminance dispersion Var_A3 of the mask region AREA3 is greater than a threshold value TH6 or not (step S81). This processing is described using a diagram showing the luminance dispersion of the mask region AREA3 using examples in FIG. 20 where the object is part of a pedestrian, a whole pedestrian, or a wall.

Figures 20A, 20B, 20C:
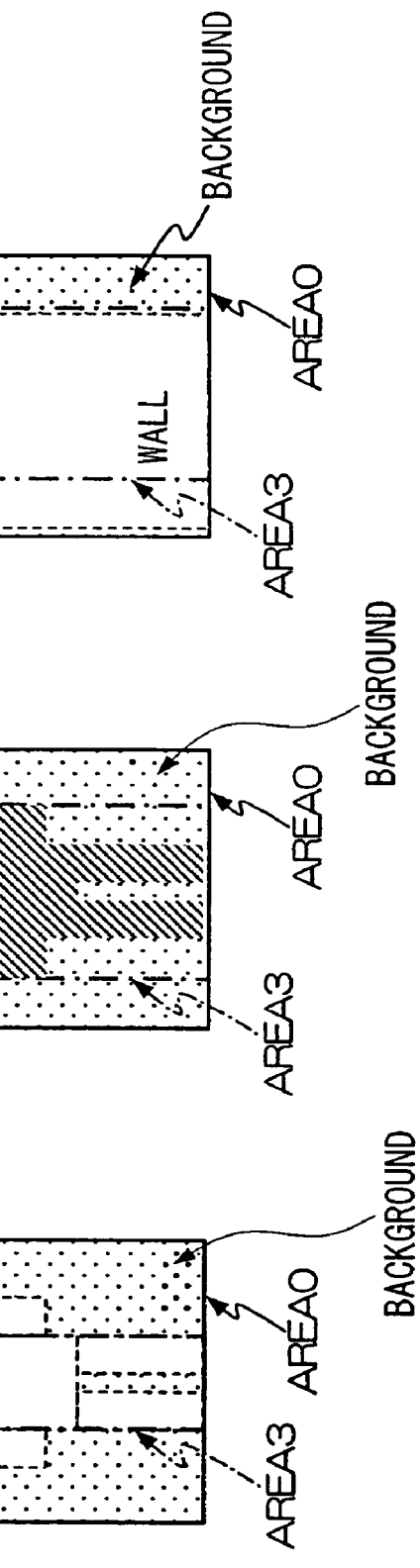
FIGS. 20A, 20B, and 20C are diagrams showing the luminance dispersion of the mask region AREA3 when the object is part of a pedestrian (20A), a whole pedestrian (20B), or a wall (20C).

Specifically, by deeming the width of the mask region AREA3 the width of the binarized object, if as shown in FIG. 20A only the head of the pedestrian is extracted by the binarization process, there is a difference in luminance between the head and the lower body part. Furthermore, if at least the upper body or the entire body of the pedestrian is extracted by the binarization process as shown in FIG. 20B then a difference in luminance occurs between the pedestrian and the background. On the other hand, in the case of an object such as a wall where there is hardly any difference in temperature over the entire object as shown in FIG. 20C, there is little difference in luminance between the parts which are extracted by binarization and those which are not, and the object is made up of straight lines and shaped like AREA3. Consequently, the luminance dispersion Var_A3 of AREA3 is a high value in the case of a pedestrian, and a low value in the case of an object like a wall.

Accordingly, in step S81 it is determined whether the object is a pedestrian or not by determining whether the luminance dispersion Var_A3 of the mask region AREA3 is greater than the threshold value TH6 or not.

In addition, when in step S81 the luminance dispersion Var_A3 of the mask region AREA3 is greater than the threshold value TH6 (YES in step S81), pedestrian determination is then performed based on variation in the shape of the object over time.

Specifically, for a binarized object to be considered a pedestrian, there is not likely to be large variation in the shape of the binarized object over time. Consequently, a determination is made as to whether or not the difference between the maximum value Max_Rate and minimum value Min_Rate of Rate, which is the ratio of the area of the circumscribed quadrangle to the area of the binarized object, is less than a threshold value TH7 within a defined period of time (step S82).

Furthermore, when in step S80 a determination is made that the environment of the vehicle 10 are being affected by rainfall (YES in step S80), then determination of the luminance dispersion Var_A3 of the mask region AREA3 is not performed in step S81, the flow proceeds to step S82, and a determination is made as to whether or not the difference between the maximum value Max_Rate and minimum value Min_Rate of Rate, which is the ratio of the area of the circumscribed quadrangle to the area of the binarized object, is less than a threshold value TH7 within a defined period of time (step S82).

On the other hand, when in step S75 the width ΔWb of the binarized object is less than the threshold value TH1 or greater than TH2 (NO in step S75), or in step S77 the height ΔHb of the binarized object is greater than or equal to the threshold value TH3 or the height ΔHg of the grayscale object is greater than or equal to the threshold value TH4 (NO in step S77), or in step S78 the height ΔHb of the binarized object is greater than or equal to the threshold value TH3 (NO in step S78), or in step S79 the highest position Yt of the object from the road surface is greater than or equal to the threshold value TH5 (NO in step S79), then it is determined that the detected object is not a pedestrian (step S83) and the pedestrian determination processing is terminated. Since this means that step S64 in FIG. 10 is NO, the flow proceeds to step S67 in FIG. 10 and it is determined that the object does not justify a warning.

In the same manner, when in step S81 the luminance dispersion Var_A3 of the mask region AREA3 is less than or equal to the threshold value TH6 (NO in step S81), or in step S82 the difference between the maximum value Max_Rate and minimum value Min_Rate of Rate, which is the ratio of the area of the circumscribed quadrangle to the area of the binarized object within a defined period of time, is greater than or equal to the threshold value TH7 (NO in step S82), then it is determined that the detected object is not a pedestrian (step S83) and the pedestrian determination processing is terminated. Since this means that step S64 in FIG. 10 is NO, the flow proceeds to step S67 in FIG. 10 and it is determined that the object does not justify a warning.

Furthermore, when in step S82 the difference between the maximum value Max_Rate and minimum value Min_Rate of Rate, which is the ratio of the area of the circumscribed quadrangle to the area of the binarized object within a defined period of time, is less than the threshold value TH7 (YES in step S82), then next, the image processing unit 1 performs more detailed pedestrian determination on the each of the shapes which make up the extracted object.

Figure 14:
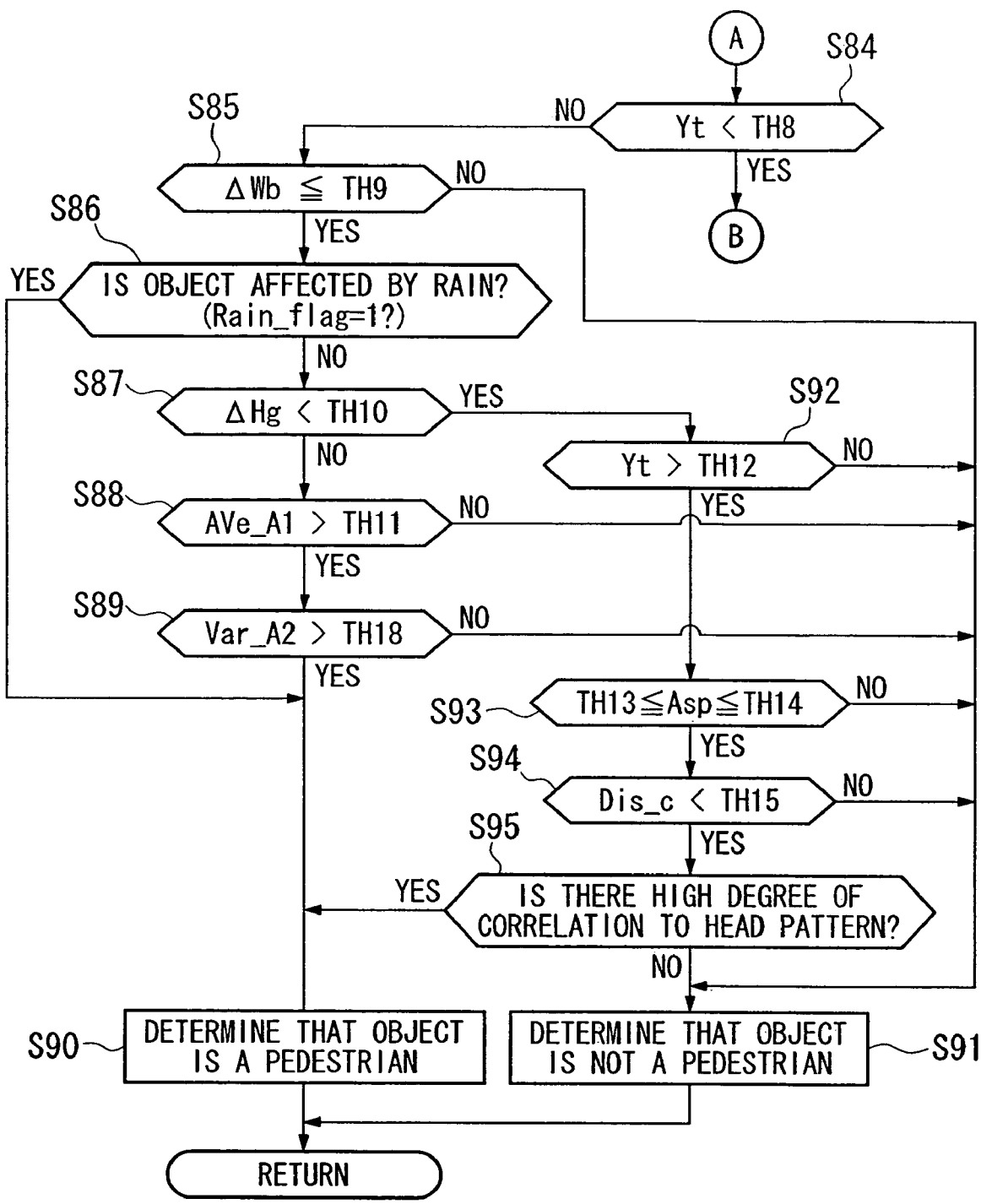
FIG. 14 is a flowchart showing steps S84-S95 of the pedestrian determination processing in the first embodiment.

Specifically, in FIG. 14, first it is determined whether the highest position Yt of the object from the road surface is greater than a threshold value TH8 (a value suitable for allowing the upper body and lower body of a pedestrian to be distinguished between) or not (step S84).

When in step S84 the highest position Yt of the object from the road surface is less than or equal to a threshold value TH8 (NO in step S84), then in order to determine whether the object is the lower body of a pedestrian or a pedestrian in a seated position, a determination is made as to whether the width ΔWb of the binarized object is less than or equal to a threshold value TH9 (a value suitable for the width of the torso of a pedestrian) or not (step S85).

FIG. 14 shows the steps involved in the processing when the binarization processing extracts the lower body of a pedestrian, and the processing for identifying a pedestrian in a seated position. When in step S85 the width ΔWb of the binarized object is less than or equal to the threshold value TH9 (YES in step S85), a determination is made as to whether the environment of the vehicle 10 are being affected by rainfall or not by determining whether the flag "Rain_flag" is "1" or not (step S86).

When in step S86 the environment of the vehicle 10 is not being affected by rainfall (NO in step S86), then in order to determine whether or not the object is a pedestrian in a seated position, it is determined whether the height ΔHg of the grayscale object is less than a threshold value TH10 (a value appropriate for the height of a pedestrian) or not (step S87).

When in step S87 the height ΔHg of the grayscale object is greater than or equal to a threshold value TH10 (NO in step S87), the object is assumed to correspond to the torso or lower body of a pedestrian, and in order to determine whether a head is present above the object or not, it is then determined whether the average luminance Ave_A1 of the upper mask region AREA1 in FIG. 19 is greater than a threshold value T11 or not (step S88).

When in step S88 the average luminance Ave_A1 of the upper mask region AREA1 is greater than the threshold value T11 (YES in step S88), because in some cases the effect of clothing on the torso of the pedestrian may result in a low level of radiated heat, it is then determined whether for objects with luminance patterns on the grayscale image, the luminance dispersion Var_A of the mask region AREA2 is greater than a threshold value TH18 or not (step S89).

When in step S89 the luminance dispersion Var_A of the mask region AREA2 is greater than the threshold value TH18 (YES in step S89), it is determined that the detected object is a pedestrian (step S90), and the pedestrian determination processing is terminated, and since means that step S64 in FIG. 10 is YES, the flow proceeds to step S65, and manmade structure determination is performed.

Furthermore, when in step S86 the environment of the vehicle 10 are being affected by rainfall (YES in step S86), the mask region determination in step S87 through step S89 is not performed, the flow proceeds to step S90, it is determined that the detected object is a pedestrian (step S90), and the pedestrian determination processing is terminated, and since means that step S64 in FIG. 10 is YES, the flow proceeds to step S65, and manmade structure determination is performed.

On the other hand, when in step S85 the width ΔWb of the binarized object is greater than the threshold value TH9 (NO in step S85), or in step S88 the average luminance Ave_A1 of the upper mask region AREA1 is less than or equal to the threshold value T11 (NO in step S88), or in step S89 the luminance dispersion Var_A2 of the mask region AREA2 is less than or equal to a threshold value TH18 (NO in step S89), it is determined that the detected object is not a pedestrian (step S91), and since means that step S64 in FIG. 10 is NO, the flow proceeds to step S67, and it is determined that the object does not justify a warning.

Furthermore, when in step S87 the height ΔHg of the grayscale object is less than the threshold value TH10 (YES in step S87), then this object is assumed to be a pedestrian in a seated position, and it is determined whether the highest position Yt of the binarized object from the road surface is greater than a threshold value TH12 (a value appropriate for distinguishing between a seated pedestrian and a standing pedestrian) or not (step S92).

When in step S92 the highest position Yt of the binarized object from the road surface is greater than the threshold value TH12 (YES in step S92), it is determined whether Asp which represents the aspect ratio APSECT of the circumscribed quadrangle is greater than or equal to a threshold value TH13 and less than or equal to a threshold value TH14 (values appropriate for a pedestrian) or not (step S93).

When in step S93 Asp which represents the aspect ratio APSECT of the circumscribed quadrangle is greater than or equal to a threshold value TH13 and less than or equal to a threshold value TH14 (YES in step S93), it is then determined whether the distance Dis_c between the circumscribed quadrangle center of gravity 102 and the center of gravity G100 of the binarized object in real space as expressed by equation (9) is less than a threshold value TH15 (a value appropriate for a pedestrian) or not (step S94).

$$Dis\_c = SQRT((Xb-Xc)^2 + (Yb-Yc)^2) \qquad (9)$$

When in step S94 the distance Dis_c is less than the threshold value TH15 (YES in step S94), because objects where ΔWb is less than or equal to 1.0 m and ΔHg is less than 1.0 m, for example, could also be objects other than pedestrians, including specifically the front parts of cars and the like, a determination is made as to whether or not there is a part in the upper mask region AREA1 of the binarized object which has a high degree of correlation to a pre-registered head pattern (step S95).

When in step S95 there is a part in the upper mask region AREA1 of the binarized object which has a high degree of correlation to the pre-registered head pattern (YES in step S95), it is determined that the detected object is a pedestrian (step S90) and the pedestrian determination processing is terminated, and since means that step S64 in FIG. 10 is YES, the flow proceeds to step S65, and manmade structure determination is performed.

On the other hand, when in step S92 the highest position Yt of the binarized object from the road surface is less than or equal to the threshold value TH12 (NO in step S92), or in step S93 Asp which represents the aspect ratio APSECT of the circumscribed quadrangle is less than the threshold value TH13 or greater than a threshold value TH14 (NO in step S93), or in step S94 the distance Dis_c is greater than or equal to the threshold value TH15 (NO in step S94), or in step S95 there is no part in the upper mask region AREA1 of the binarized object which has a high degree of correlation to the pre-registered head pattern (NO in step S95), it is determined that the detected object is not a pedestrian (step S91) and the pedestrian determination processing is terminated. Since this means that step S64 in FIG. 10 is NO, the flow proceeds to step S67 in FIG. 10 and a determination is made that the object does not justify a warning.

Figure 15:
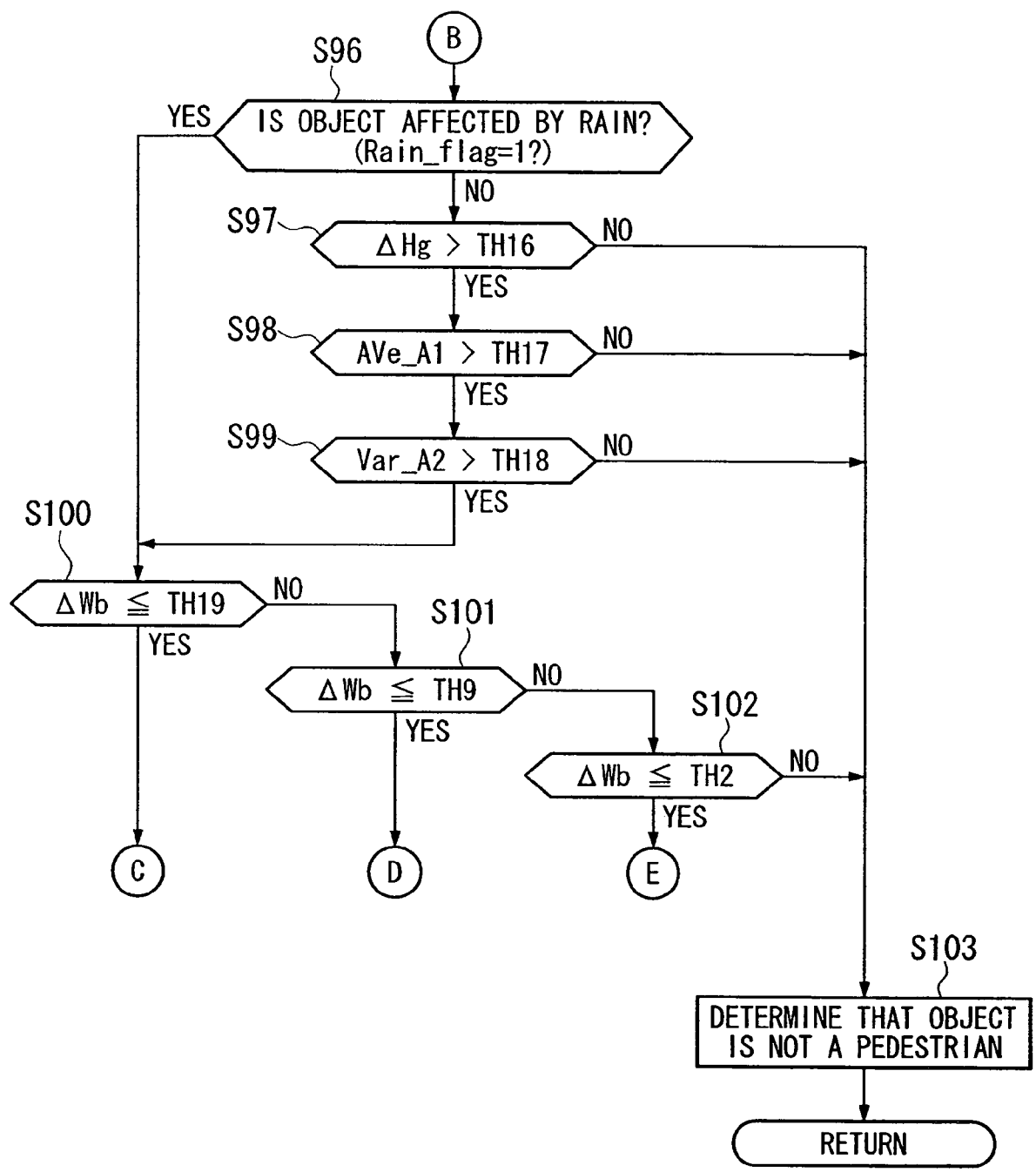
FIG. 15 is a flowchart showing steps S96-S103 of the pedestrian determination processing in the first embodiment.

Furthermore, in step S84 in FIG. 14, when the highest position Yt of the binarized object from the road surface is greater than the threshold value TH8 (a value suitable for allowing the upper body and lower body of a pedestrian to be distinguished between) (YES in step S84), then the flow proceeds to step S96 in FIG. 15, and it is determined whether the environment of the vehicle 10 are being affected by rainfall or not by determining whether the flag "Rain_flag" is "1" or not (step S96).

When in step S96 it is determined that the environment of the vehicle 10 are not being affected by rainfall (NO in step S96), then in order to determine whether or not the object is a body suspended in mid-air (a curved mirror, for example), a determination is made as to whether the height ΔHg of the grayscale object is greater than a threshold value TH16 (the same value as the threshold value TH8 mentioned above) or not (step S97).

FIG. 15 shows the steps involved in the processing for identifying a pedestrian whose head or upper body has been extracted by the binarization processing. When in step S97 the height ΔHg of the grayscale object is greater than the threshold value TH16 (YES in step S97), the object is not a body suspended in mid-air, and therefore, it is then determined whether or not there is a head at the top of the object region (AREA0), or if there is a torso. Specifically, it is determined whether or not the average luminance Ave_A1 of the mask region AREA 1 is greater than a threshold value TH17 because a head is exposed (step S98).

When in step S98 the average luminance Ave_A1 of the mask region AREA1 is greater than the threshold value TH17 (YES in step S98), because in some cases the effect of clothing on the torso of the pedestrian may result in a low level of radiated heat, it is then determined whether for objects with luminance patterns on the grayscale image the luminance dispersion Var_A2 of the mask region AREA2 is greater than the threshold value TH18 or not (step S99).

Furthermore, when in step S99 the luminance dispersion Var_A2 of the mask region AREA2 is greater than the threshold value TH18 (YES in step S99), then first, in order to identify a pedestrian whose head or upper body has been extracted by the binarization processing, it is determined whether the width ΔWb of the binarized object is less than or equal to a threshold value TH19 (a value appropriate as a width which allows the head or upper body of a pedestrian to be distinguished between) or not (step S100).

Furthermore, when in step S96 it is determined that the environment of the vehicle 10 are being affected by rainfall (YES in step S96), then the mask region determination in step S97 through S99 is not performed, the flow proceeds to step S100, and in order to identify a pedestrian whose head or upper body was extracted by the binarization processing, it is determined whether the width ΔWb of the binarized object is less than or equal to the threshold value TH19 or not (step S100).

Next, when in step S100 the width ΔWb of the binarized object is greater than the threshold value TH19 (NO in step S100), then in order to identify pedestrians whose whole body or at least upper body has been extracted by the binarization processing, it is determined whether the width ΔWb of the binarized object is less than or equal to the threshold value TH9 (a value appropriate for the torso width of a pedestrian) or not (step S101).

In addition, when in step S101 the width ΔWb of the binarized object is greater than the threshold value TH9 (NO in step S101), then in order to determine whether a plurality of pedestrians are walking in parallel or not, it is determined whether the width ΔWb of the binarized object is less than or equal to the threshold value TH2 (a value appropriate for the width of a torso of a pedestrian) or not (step S102).

Furthermore, in the determinations above, when in step S97 the height ΔHg of the grayscale object is less than or equal to the threshold value TH16 (NO in step S97), or in step S98 the average luminance Ave_A1 of the mask region AREA1 is less than or equal to the threshold value TH17 (NO in step S98), or in step S99 the luminance dispersion Var_A2 of the mask region AREA2 is less than or equal to the threshold value TH18 (NO in step S99), or in step S102 the width ΔWb of the binarized object is greater than the threshold value TH2 (NO in step S102), it is determined that the detected object is not a pedestrian (step S103) and the pedestrian determination processing is terminated. Since this means that step S64 in FIG. 10 is NO, the flow proceeds to step S67 in FIG. 10 and it is determined that the object does not justify a warning.

Figure 16:
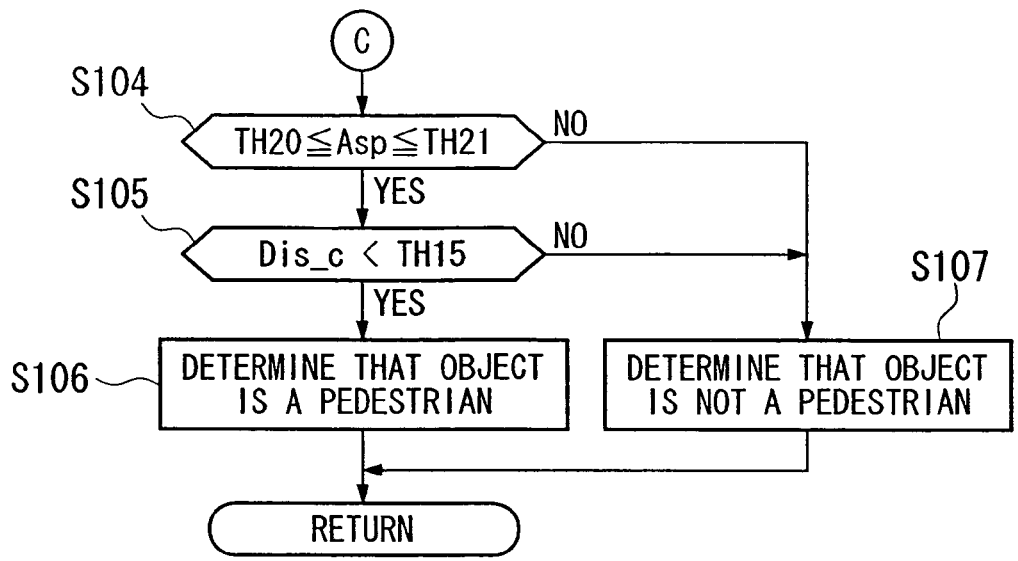
FIG. 16 is a flowchart showing steps S104-S107 of the pedestrian determination processing in the first embodiment.

On the other hand, when in step S1100 the width ΔWb of the binarized object is less than or equal to the threshold value TH19 (YES in step S100), then assuming that the object is the head or upper body of a pedestrian extracted by the binarization processing, the flow proceeds to step S104 in FIG. 16, and it is determined whether Asp which represents the aspect ratio APSECT of the circumscribed quadrangle of the binarized object is greater than or equal to a threshold value TH20 and less than or equal to a threshold value TH21 (values appropriate for the head or upper body of a pedestrian) or not (step S104).

FIG. 16 shows the steps involved in the processing for identifying a pedestrian whose head or upper body has been extracted by the binarization processing, and when in step S104 Asp which represents the aspect ratio APSECT of the circumscribed quadrangle of the binarized object is greater than or equal to a threshold value TH20 and less than or equal to a threshold value TH21 (YES in step S1104), it is then determined whether the distance Dis_c between the circumscribed quadrangle center of gravity 102 and the center of gravity G100 of the binarized object in real space as mentioned above is less than the threshold value TH15 (step S105) or not.

When in step S105 the distance Dis_c is less than the threshold value TH15 (YES in step S105), it is determined that the detected object is a pedestrian (step S106) and the pedestrian determination processing is terminated, and since means that step S64 in FIG. 10 is YES, the flow proceeds to step S65 in FIG. 10, and manmade structure determination is performed.

On the other hand, when in step S104 Asp which represents the aspect ratio APSECT of the circumscribed quadrangle of the binarized object is less than the threshold value TH20 or greater than the threshold value TH21 (NO in step S104), or in step S105 the distance Dis_c is greater than or equal to the threshold value TH15 (NO in step S105), then it is determined that the detected object is not a pedestrian (step S107) and the pedestrian determination processing is terminated. Since this means that step S64 in FIG. 10 is NO, the flow proceeds to step S67 in FIG. 10 and it is determined that the object does not justify a warning.

Figure 17:
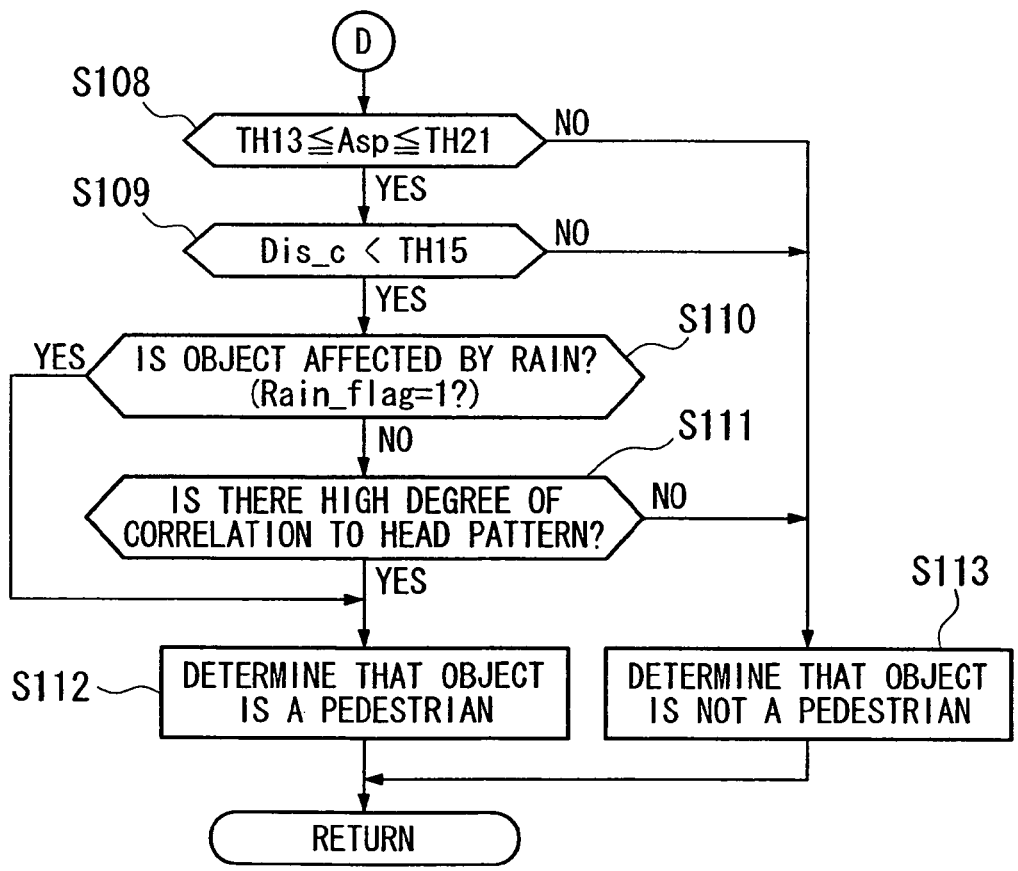
FIG. 17 is a flowchart showing steps S108-S113 of the pedestrian determination processing in the first embodiment.

Furthermore, when in step S101 in FIG. 15 the width ΔWb of the binarized object is less than or equal to the threshold value TH9 (YES in step S101), then assuming that the object is the whole or at least the upper body of a pedestrian extracted by the binarization processing, the flow proceeds to step S108 in FIG. 17, and it is determined whether Asp which represents the aspect ratio APSECT of the circumscribed quadrangle of the binarized object is greater than or equal to a threshold value TH13 and less than or equal to a threshold value TH21 (values appropriate for the whole or upper body of a pedestrian) or not (step S108).

FIG. 17 shows the steps involved in the processing for identifying a pedestrian whose upper body or entire body has been extracted by the binarization processing, and when in step S108 Asp which represents the aspect ratio APSECT of the circumscribed quadrangle of the binarized object is greater than or equal to a threshold value TH13 and less than or equal to a threshold value TH21 (YES in step S108), it is then determined whether the distance Dis_c between the circumscribed quadrangle center of gravity 102 and the center of gravity G100 of the binarized object in real space as mentioned above is less than the threshold value TH15 or not (step S109).

When in step S109 the distance Dis_c is less than the threshold value TH15 (YES in step S1109), then a determination is made as to whether or not the environment of the vehicle 10 are being affected by rainfall by determining whether or not the flag "Rain_flag" is "1" (step S110).

When in step S110 the environment of the vehicle 10 are not being affected by rainfall (NO in step S110), because objects may include objects other than pedestrians, for example the front parts of cars and the like, it is determined whether there is a part in the upper mask region AREA1 of the binarized object which has a high degree of correlation to the pre-registered head pattern or not (step S111).

When in step S111 there is a part in the upper mask region AREA1 of the binarized object which has a high degree of correlation to the pre-registered head pattern (YES in step S111), it is determined that the detected object is a pedestrian (step S112) and the pedestrian determination processing is terminated, and since means that step S64 in FIG. 10 is YES, the flow proceeds to step S65 in FIG. 10, and manmade structure determination is performed.

Furthermore, when in step S110 the environment of the vehicle 10 are being affected by rainfall (YES in step S110), the mask region determination in step S111 is not performed, the flow proceeds to step S112, it is determined that the detected object is a pedestrian (step S112) and the pedestrian determination processing is terminated. Since this means that step S64 in FIG. 10 is YES, the flow proceeds to step S65, and manmade structure determination is performed.

On the other hand, when in step S108 Asp which represents the aspect ratio APSECT of the circumscribed quadrangle of the binarized object is less than the threshold value TH13 or greater than the threshold value TH21 (NO in step S108), or in step S109 the distance Dis_c is greater than or equal to the threshold value TH15 (NO in step S109), or in step S111 the upper mask region AREA1 of the binarized object does not contain a part which has a high degree of correlation to the pre-registered head pattern (NO in step S111), then it is determined that the detected object is not a pedestrian (step S113), and the pedestrian determination processing is terminated. Since this means that step S64 in FIG. 10 is NO, the flow proceeds to step S67 in FIG. 10 and it is determined that the object does not justify a warning.

Furthermore, when in step S102 in FIG. 15 the width ΔWb of the binarized object is less than or equal to the threshold value TH2 (YES in step S102), then the object comprises a plurality of pedestrians are walking in parallel, and a judgment is made that the circumscribed quadrangle of the object includes a large background area, the flow proceeds to step S114, and it is determined whether Rate which is the ratio of the area of the circumscribed quadrangle to the area of the binarized object within a defined period of time is less than a threshold value TH22 or not (step S114).

Figure 18:
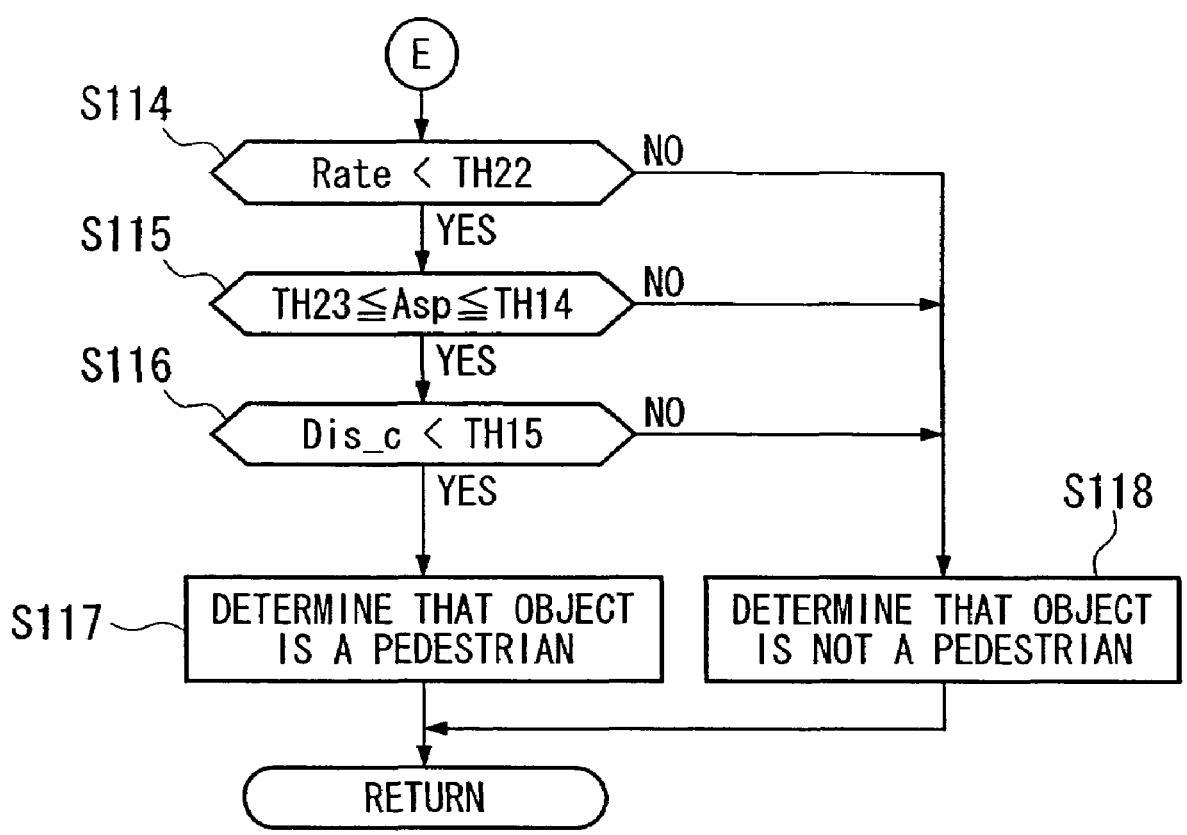
FIG. 18 is a flowchart showing steps S114-S118 of the pedestrian determination processing in the first embodiment.

FIG. 18 shows the steps involved in the processing for a case where a plurality of pedestrians are walking in parallel, and in step S114, if Rate which is the ratio of the area of the circumscribed quadrangle to the area of the binarized object within a defined period of time is less than a threshold value TH22 (YES in step S114), then it is determined whether Asp which represents the aspect ratio APSECT of the circumscribed quadrangle is greater than or equal to a threshold value TH23 and less than or equal to the threshold value TH14 (values appropriate for judging pedestrians walking in parallel) or not (step S115).

When in step S115 Asp which represents the aspect ratio APSECT of the circumscribed quadrangle is greater than or equal to a threshold value TH23 and less than or equal to the threshold value TH14 (YES in step S115), it is then determined whether the distance Dis_c between the circumscribed quadrangle center of gravity 102 and the center of gravity G100 of the binarized object in real space as mentioned above is less than the threshold value TH15 or not (step S116).

When in step S116 the distance Disc_c is less than the threshold value TH15 (YES in step S116), it is determined that the detected object is a pedestrian (step S117), and the pedestrian determination processing is terminated. Since means that step S64 in FIG. 10 is YES, the flow proceeds to step S65, and manmade structure determination is performed.

On the other hand, when in step S114 Rate which is the ratio of the area of the circumscribed quadrangle to the area of the binarized object within a defined period of time is greater than or equal to the threshold value TH22 (NO in step S114), or in step S115 Asp which represents the aspect ratio APSECT of the circumscribed quadrangle is less than the threshold value TH23 or greater than the threshold value TH14 (NO in step S115), or in step S116 the distance Dis_c is greater than or equal to the threshold value TH15 (NO in step S116), then it is determined that the detected object is not a pedestrian (step S118), and the pedestrian determination processing is terminated. Since means that step S64 in FIG. 10 is NO, the flow proceeds to step S67, and it is determined that the object does not justify a warning.

In the above embodiment, a distinction was made between a state where the bodies in the environment of the vehicle 10 and the infrared cameras 2R and 2L are normal and a state where they are affected by rainfall (including cases where the camera lens is dirty) by comparing the difference between the height ΔHg of the grayscale object and the height ΔHb of the binarized object to a predetermined value ΔR, but this applies to a case as shown in FIG. 2 in which the two infrared cameras 2R and 2L are disposed side by side at the front of the vehicle at symmetrical positions relative to the central axis of the vehicle 10 in the width directions. Therefore, when the two infrared cameras 2R and 2L are disposed one above the other in the vertical direction, a distinction may be made between a state where the bodies in the environment of the vehicle 10 and the infrared cameras 2R and 2L are normal and a state where they are affected by rainfall (including cases where the camera lens is dirty) by comparing the difference between the width of the grayscale object and the width of the binarized object to a predetermined value.

Furthermore, in the present embodiment, the image processing unit 1 includes a binarized object extraction device, a binarized object feature quantity calculation device, an object image extraction device, an object image feature quantity calculation device, a feature quantity comparison device, a body state determination device, and a pedestrian recognition device. More specifically, the processing in step S7 in FIG. 3 and step S31 in FIG. 7 corresponds to the binarized object extraction device, the processing in step S8 in FIG. 3 and step S71 in FIG. 13 corresponds to the binarized object feature quantity calculation device, and the processing in step S33 in FIG. 7 and step S73 in FIG. 13 corresponds to the object image extraction device and the object image feature quantity calculation device. Furthermore, the processing in step S34 in FIG. 7 corresponds to the feature quantity comparison device, the processing step S35 through step S52 in FIG. 7 and FIG. 8 corresponds to the body state determination device, and the processing in step S72 and step S74 through step S118 in FIG. 13 through FIG. 18 corresponds to the pedestrian recognition device.

As described above, with the vehicle environment monitoring device of the present embodiment, under normal conditions it is possible to distinguish between the height ΔHg of the grayscale object and the height ΔHb of the binarized object. However, when the state of the body is being affected by raindrops attached to the camera lens, water vapor or raindrops in the air, or wetness, for example, the difference between the height ΔHg of the grayscale object and the height ΔHb of the binarized object tends to disappear. Therefore whether the environment of the vehicle 10 and the infrared cameras 2R and 2L are in a normal state or in a state in which the image is being affected by rainfall (including cases where the camera lens is dirty) can be determined by comparing the difference between the height ΔHg of the grayscale object and the height ΔHb of the binarized object to the predetermined value ΔH.

Accordingly, because the state of a body can be determined without relying on signal detection from wiper operation signals or a raindrop sensor or the like, there is no need to provide the sensors and the like required by these systems, and an effect is obtained whereby the cost is lowered and the reliability of pedestrian recognition is improved, and a vehicle environment monitoring device can be realized which can determine the state of a body accurately.

In addition, if the environment of the vehicle 10 and the infrared cameras 2R and 2L are in a normal state (not affected by rainfall), the pedestrian recognition device extracts a grayscale object from the grayscale image of the range which contains the binarized object using the luminance variation in the grayscale image, sets a plurality of search regions in the region of the grayscale object, and identifies pedestrians within the search regions based on the shape or luminance dispersion of the search regions. Specifically, if the width of the image of the object is unnatural for a pedestrian, or the height of the image of the object is unnatural for a pedestrian, then these bodies can be removed from consideration as objects, and by determining the presence of characteristics of pedestrians which are natural such as parts with high luminance dispersion corresponding to a head, or parts with high luminance dispersion corresponding to a torso, or whether the body may be a wall or the like which has low luminance dispersion, images of bodies which have different luminance dispersion from pedestrians can be removed from consideration as objects.

Furthermore, if the bodies in the environment of the vehicle 10 or the infrared cameras 2R and 2L are being affected by rainfall, then only the existence conditions of the binarized objects are determined, and pedestrians within the binary image are identified from the height or size or the like of the binarized objects in the image. Specifically, because the amount of infrared rays radiated by the object reduces, determinations based on luminance dispersion are not performed, and the only processing performed is to remove bodies for which the width of the image of the object or the height of the image of the object is unnatural for a pedestrian from the image of the object, which prevents pedestrian detection errors caused by determinations using luminance dispersion.

Accordingly, because the state of a body can be determined without relying on signal detection or the like from wiper operation signals or a raindrop sensor, there is no need to provide the sensors and the like required by these systems, and an effect is obtained whereby the cost is lowered and the reliability of pedestrian recognition is improved, and a vehicle environment monitoring device can be realized which can recognize pedestrians only in a stable manner. In addition, an effect is obtained whereby the accuracy of pedestrian detection can be maintained regardless of the state of the bodies in the environment of the vehicle 10, and the infrared cameras 2R and 2L. Furthermore, in contrast to a case in which the state of the histogram of the entire image is used to determine whether rain is falling, the state of the body can be determined directly, which has an effect of enabling a vehicle environment monitoring device to be realized which can recognize pedestrians only in a stable manner without being affected by the contents of the background.

Furthermore, by increasing the number of bodies (objects) for which the height $\Delta Hg$ of the grayscale object and the height $\Delta Hb$ of the binarized object are compared, or the number of image frames used to determine the state of the vehicle 10 environment or the camera lens, and then distinguishing collectively between a state in which the bodies in the environment of the vehicle 10 and the infrared cameras 2R and 2L are normal or a state in which they are being affected by rainfall (including cases where the camera lens is dirty) based on the proportion of positive determination results relative to the total number of bodies or image frames, an effect is obtained whereby the reliability of body state determination in the body state determination device can be improved, and errors in state determination and pedestrian recognition can be prevented.

In addition, accurate body state determination can be executed in the body state determination device and accurate pedestrian recognition can be executed in the pedestrian recognition device by comparing the height $\Delta Hg$ of the grayscale object and the height $\Delta Hb$ of the binarized object when the two infrared cameras 2R and 2L are arranged side by side. Furthermore, accurate body state determination can be executed in the body state determination device and accurate pedestrian recognition can be executed in the pedestrian recognition device by comparing the width of the grayscale object and the width of the binarized object when the two infrared cameras 2R and 2L are arranged vertically.

Accordingly, an affect is obtained whereby a vehicle environment monitoring device can be realized which is compatible with any arrangement of the infrared cameras 2R and 2L.

Second Embodiment

A second embodiment of the present invention is described below.

Overall Construction

The construction of the vehicle environment monitoring device of the second embodiment of the present invention is the same as that of the vehicle environment monitoring device of the first embodiment shown in FIG. 1, and a description thereof is therefore omitted. Specifically, the difference between the vehicle environment monitoring device of the first embodiment and the vehicle environment monitoring device of the second embodiment is that in the vehicle environment monitoring device of the first embodiment, a distinction is made between a state in which the environment of the vehicle 10 and the infrared cameras 2R and 2L are normal and a state in which they are being affected by rainfall (including cases where the camera lens is dirty) by comparing the difference between the height $\Delta Hg$ of the grayscale object and the height $\Delta Hb$ of the binarized object to a predetermined value $\Delta H$, but in contrast, in the vehicle environment monitoring device of the second embodiment, a distinction is made between a state in which the environment of the vehicle 10 and the infrared cameras 2R and 2L are normal and a state in which they are being affected by rainfall (including cases where the camera lens is dirty) by extracting for a body two types of binarized objects with different luminance thresholds by binarizing a grayscale image of the infrared image using a plurality of luminance thresholds, and noting the difference in a feature quantity between the two types of binarized objects corresponding to the same body.

The specific operation of the second embodiment is described with reference to the drawings.

Object Detection/Warning Operation

Figure 21:
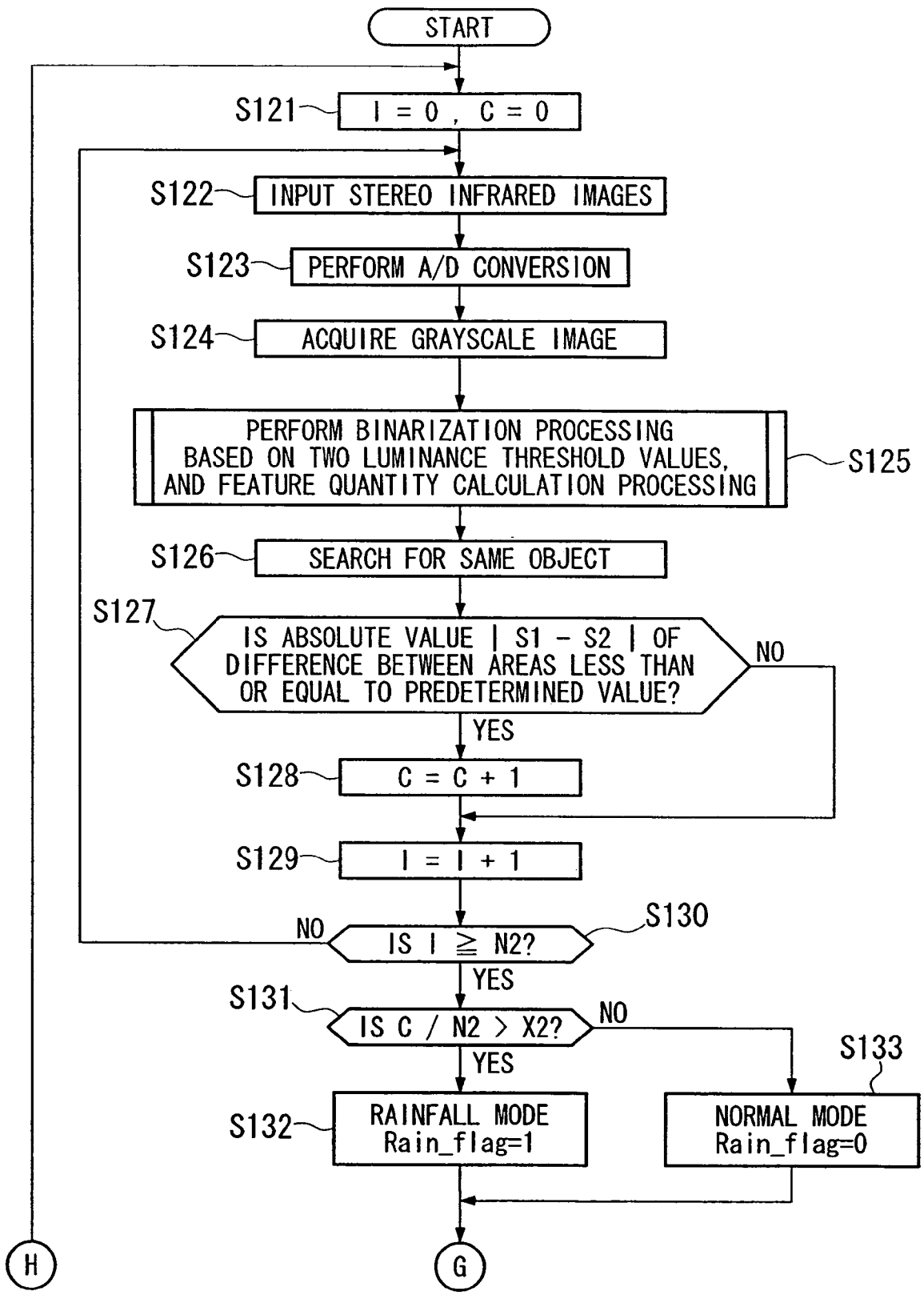
FIG. 21 is a diagram showing the object detection and warning operation in a vehicle environment monitoring device according to a second embodiment of the present invention.
Figure 22:
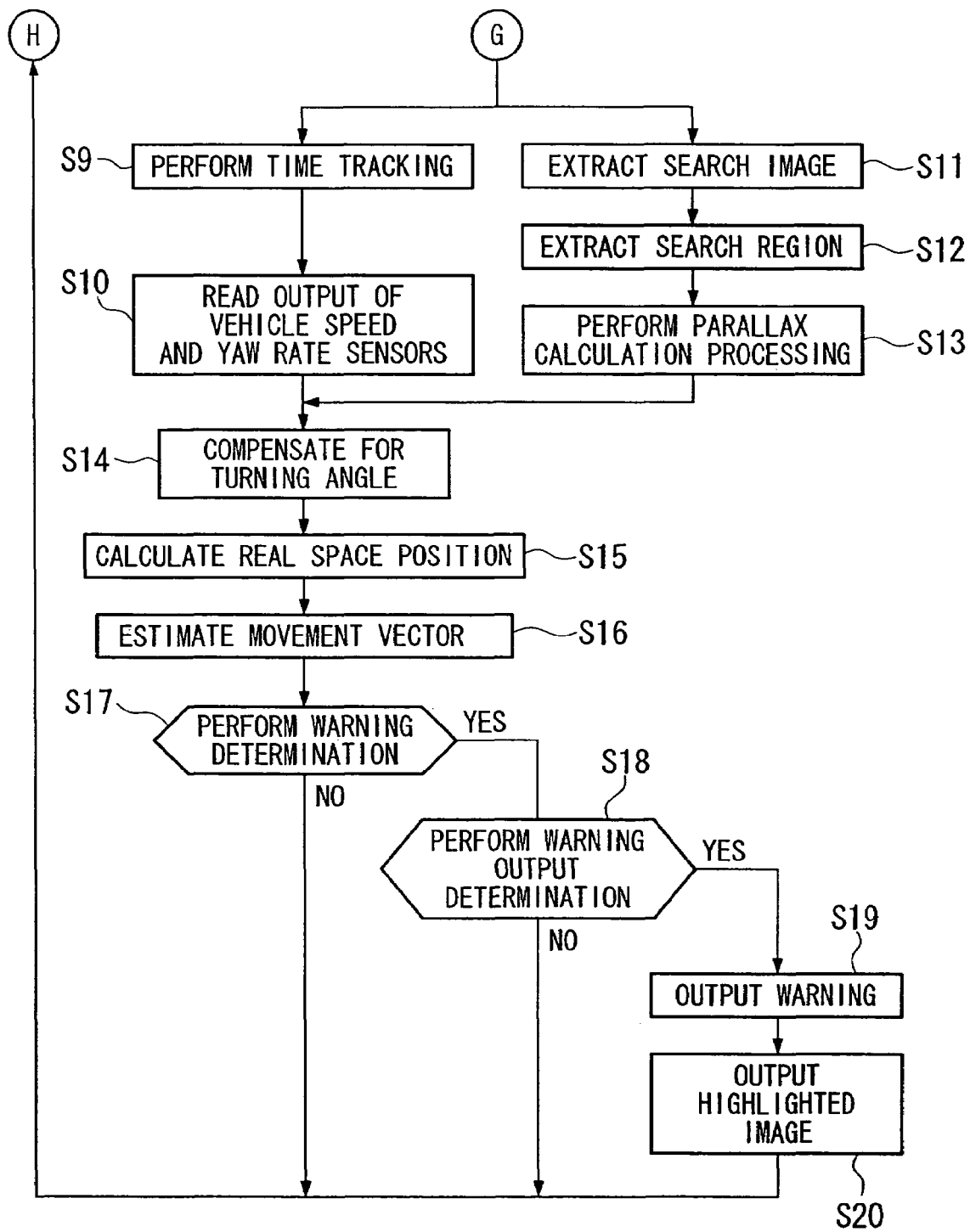
FIG. 22 is a continuation of the diagram of FIG. 21 showing the object detection and warning operation in a vehicle environment monitoring device according to the second embodiment of the present invention.

FIG. 21 and FIG. 22 are flowcharts showing the object detection and warning operations for pedestrians in the image processing unit 1 of the vehicle environment monitoring device of the second embodiment.

In FIG. 21, first the image processing unit 1 resets the variable I and the variable C to "zero" (step S121).

Next, the image processing unit 1 acquires the infrared images as the output signals of the infrared cameras 2R and 2L (step S122), performs A/D conversion (step S123), and stores the gray scale image in the image memory (step S124). Here the infrared camera 2R acquires the right image and the infrared camera 2L acquires the left image. Furthermore, because in the right image and the left image the same body appears displaced in the horizontal direction on the display screen, this displacement (parallax) enables calculation of the distance to the body.

After the grayscale image is obtained in step S124, the right image obtained by the infrared camera 2R is assigned as the reference image, and using two luminance threshold values (TH_1 and TH_2, where TH_2>TH_1), the grayscale image is binarized, thereby extracting a plurality of bodies in the image as a group of binarized objects based on the luminance threshold value TH_1 and a group of binarized objects based on the luminance threshold value TH_2. At the same time, a feature quantity is calculated for each binarized object (step S125). The binarization processing using the two luminance threshold values (TH_1 and TH_2) in step S1125, and the process for calculating the feature quantity of the binarized objects, are described in detail below.

Figure 23:
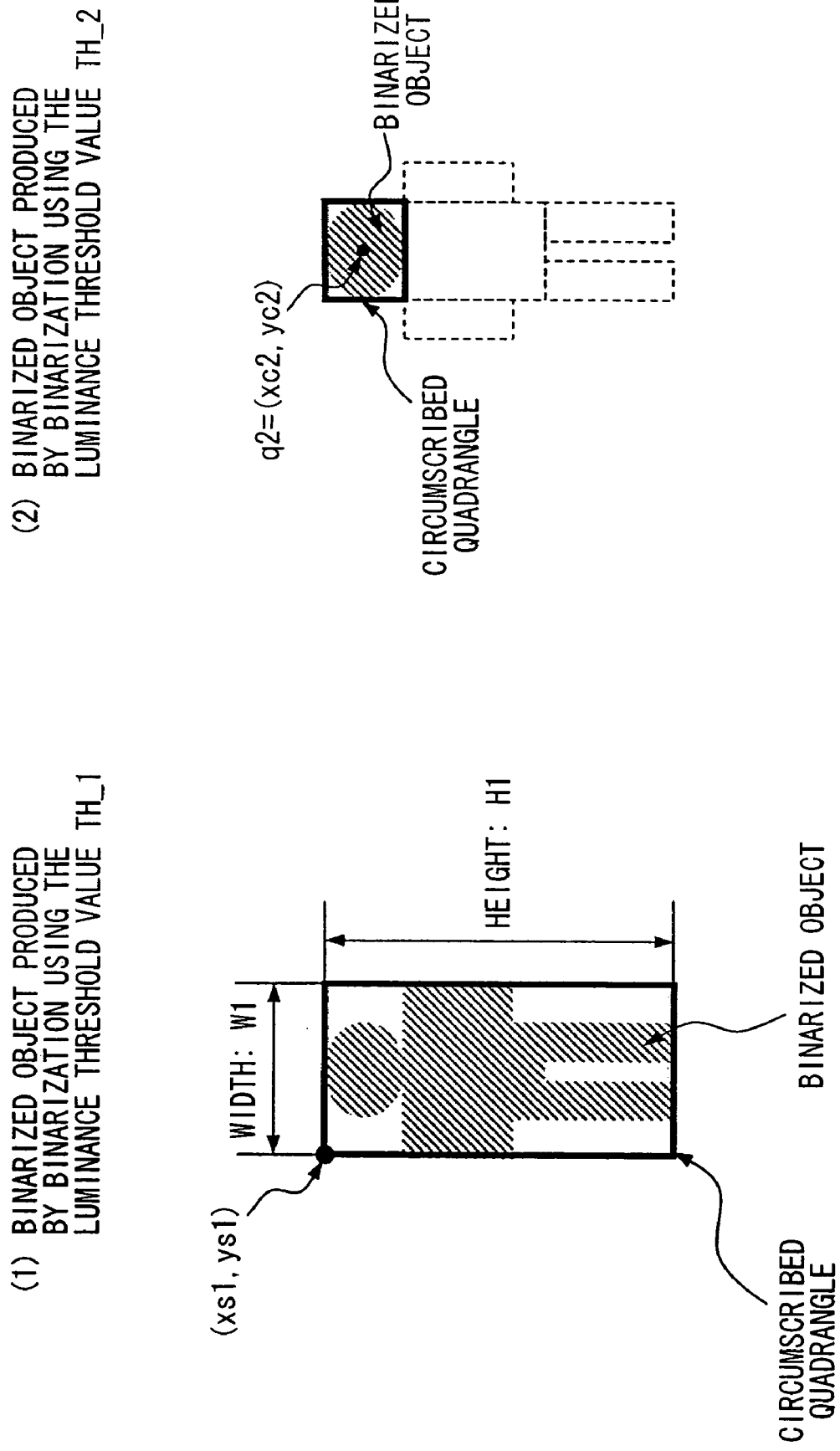
FIG. 23 is a diagram showing a method for searching the binarized objects which are based on two luminance threshold values for binarized objects which correspond to bodies in the same position.

Next, the image processing unit 1 executes a search for objects in the same position, which finds in each group binarized objects which correspond to the same body (object) (step S126). Here, describing the search for objects in the same position in concrete terms, if the center of gravity position q2=(xc2, yc2) of the binarized object binarized using the luminance threshold value TH_2 shown in FIG. 23(2) is inside the circumscribed quadrangle of the binarized object binarized using the luminance threshold value TH_1 shown in FIG. 23(1), then it is determined that the two types of binarized object binarized using these different luminance threshold values both correspond to the same body. To express this in the form of a numerical expression, if the reference points of the circumscribed quadrangle of the binarized object binarized using the luminance threshold value TH_1 are deemed (xs1, ys1), the width of the circumscribed quadrangle is deemed W1 and the height H1, then the center of gravity position q2=(xc,2, yc2) of the binarized object binarized using the luminance threshold value TH_2 should satisfy (xs1<xc2<xs1+W1) and (ys1<yc2<ys1+H1).

After two types of binarized object based on different luminance threshold values which both correspond to the same body are specified, a determination is made as to whether the absolute value (|S1−S2|) of the difference between the area S1 and S2 of the binarized objects is less than or equal to a predetermined value or not (step S127). In other words, if the environment of the vehicle 10 and the infrared cameras 2R and 2L are in a normal state, when focused on one body, the body has a mixture of low temperature parts and high temperature parts, and therefore when the threshold value used during binarization is varied, the higher the threshold value for binarization the smaller the area of the binarized object which contains the body. However, if the environment of the vehicle 10 and the infrared cameras 2R and 2L are not in a normal state, and are affected by rainfall (including cases in which the camera lens is dirty), then when focused on one body in the same manner, the effect on the state of the body caused by raindrops attached to the camera lens, water vapor or raindrops in the air, or wetness, for example, can result in an inability to detect the temperature differences in each part of the body, and therefore, even when the threshold value used during binarization is varied, there tends to be no variation in the area of the binarized object which contains the body.

Accordingly, by comparing the absolute value (|S1−S2|) of the difference between the areas S1 and S2 of the two types of binarized objects with different luminance thresholds and corresponding to the same body to a predetermined value and thereby determining whether or not the area has changed, a determination can be made as to whether the environment of the vehicle 10 and the infrared cameras 2R and 2L are in a normal state, or being affected by rainfall.

When in step S127 the absolute value (|S1−S2|) of the difference between the areas S1 and S2 of the two types of binarized objects with different luminance thresholds and corresponding to the same body is less than or equal to a predetermined value (YES in step S127), the image processing unit 1 increments the variable C by "1", and the number of binarized objects for which the absolute value (|S1−S2|) of the difference between the area S1 and S2 of the two types of binarized objects with different luminance thresholds and corresponding to the same body is less than or equal to a predetermined value is counted, as the number of objects presumed to be affected by rainfall (step S128).

The variable I is then incremented by "1" (step S129).

When in step S127 the absolute value (|S1−S2|) of the difference between the area S1 and S2 of the two types of binarized objects with different luminance thresholds and corresponding to the same body is greater than the predetermined value (NO in step S127), the flow proceeds to step S129, and the image processing unit 1 increments the variable I by "1" (step S129).

It is then determined whether the variable I is greater than or equal to the total number of binarized objects N2 binarized using the luminance threshold value TH_1 or not (step S130), and when the variable I is less than the total number N2 (NO in step S130), the image processing unit 1 returns the flow to step S122, and repeats the processing above. The reason a determination is made as to whether or not the variable I is greater than or equal to the total number of binarized objects N2 binarized using the luminance threshold value TH_1 is because luminance threshold value TH_1<luminance threshold value TH_2, and there is a higher probability of the binarized objects binarized using the luminance threshold value TH_1 including all of the bodies.

On the other hand, when in step S130 the variable I is greater than or equal to the total number N1 of binarized objects (YES in step S130), it is determined whether or not the ratio C/N2 of the variable C to the total number of binarized objects N2, that is the ratio C/N2 of the number of binarized objects for which the absolute value (|S1−S2|) of the difference between the area S1 and S2 of the two types of binarized objects with different luminance thresholds and corresponding to the same body as represented by C, to the total number of binarized objects N2, is greater than a predetermined value X2 (step S131).

In step S131, when the ratio C/N2, of the variable C which represents the number of binarized objects for which (|S1−S2|) is less than or equal to a predetermined value to the total number of binarized objects N2, is greater than the predetermined value X2 (YES in step S131), the operation mode of the pedestrian determination processing is judged to be rainfall mode, and the flag "Rain_flag" which indicates the operation mode of the pedestrian determination processing is set to "1" (step S132).

Furthermore, when in step S131 the ratio C/N2, of the variable C which represents the number of binarized objects for which (|S1−S2|) is less than or equal to a predetermined value to the total number of binarized objects N2, is less than or equal to the predetermined value X2 (NO in step S131), the operation mode of the pedestrian determination processing is judged to be normal mode, and the flag "Rain_flag" which indicates the operation mode of the pedestrian determination processing is set to "0" (step S133).

When the flag Rain_flag" which indicates the operation mode of the pedestrian determination processing is set successfully, the image processing unit 1 proceeds to step S9 in FIG. 22, and time tracking of the object, that is recognition of the same object in each sampling period, is performed (step S9). At the same time, the image processing unit 1 proceeds to step S11 in FIG. 22, and calculates the distance z between the object and the vehicle 10 by the processing step S11 through step S13.

Because the processing step S9 through step S20 is the same as the object detection and warning operation processing described in the first embodiment using FIG. 3, a description thereof is omitted here. Furthermore, the processing in step S21 which is executed in the first embodiment is not executed in the present embodiment.

In addition, with the object detection and warning operation processing in the first embodiment, the steps in the processing are such that when in step S17 it is determined that there is no possibility of a collision between the vehicle 10 and the detected object (NO in step S17), when in step S18 it is determined that the braking action of the driver of the vehicle 10 will result in the collision being avoided (NO in step S18), or when the image obtained by the infrared camera 2R, for example, is output to the image display device 7 and the approaching object is displayed as a highlighted image for the driver of the vehicle 10 (step S20), the flow returns to step S1, but in the present embodiment, the steps in the processing are such that the flow returns to step S121 and the above processing is repeated.

Alternative Mode of Object Detection/Warning Operation in the Second Embodiment

In the processing step S121 through step S133 in FIG. 21, the procedure was described for performing rainfall determination for a plurality of bodies and choosing the operation mode of the pedestrian determination processing from the gathered results in order to improve the robustness of the determination, but in the object detection and warning operation in the present embodiment, in order to simplify the processing, the operation mode of the rainfall determination processing may be chosen based on the results from a single image frame instead of using collected results for a plurality of image frames. Specifically, when in step S127 in FIG. 21 the absolute value (|S1−S2|) of the difference between the area S1 and S2 of the two types of binarized objects with different luminance thresholds and corresponding to the same body is less or equal to the predetermined value (YES in step S127), the flow proceeds to step S132, and determining that the operation mode of the pedestrian determination processing should be rainfall mode, the image processing unit 1 sets the flag "Rain_flag" which indicates the operation mode of the pedestrian determination processing to "1" (step S132).

Furthermore, when in step S127 the absolute value (|S1−S2|) of the difference between the area S1 and S2 of the two types of binarized objects with different luminance thresholds and corresponding to the same body is greater than the predetermined value (NO in step S127), the flow proceeds to step S133, and determining that the operation mode of the pedestrian determination processing should be normal mode, the image processing unit 1 sets the flag "Rain_flag" which indicates the operation mode of the pedestrian determination processing to "0" (step S133).

When instead of using the collected results for a plurality of image frames, the determination results for a single frame are used to determine the operation mode of the pedestrian determination processing, the processing executed in step S128 through S131 which gathers the contents of the determinations made for the plurality of bodies need not take place.

Binarization Processing Using Two Luminance Threshold Values and Feature Quantity Calculation Processing for Binarized Objects Next, the binarization processing performed using two luminance threshold values (TH_1 and TH_2) and the feature quantity calculation processing for binarized objects in step S125 in FIG. 21 are described in further detail with reference to the flowchart in FIG. 24.

Figure 24:
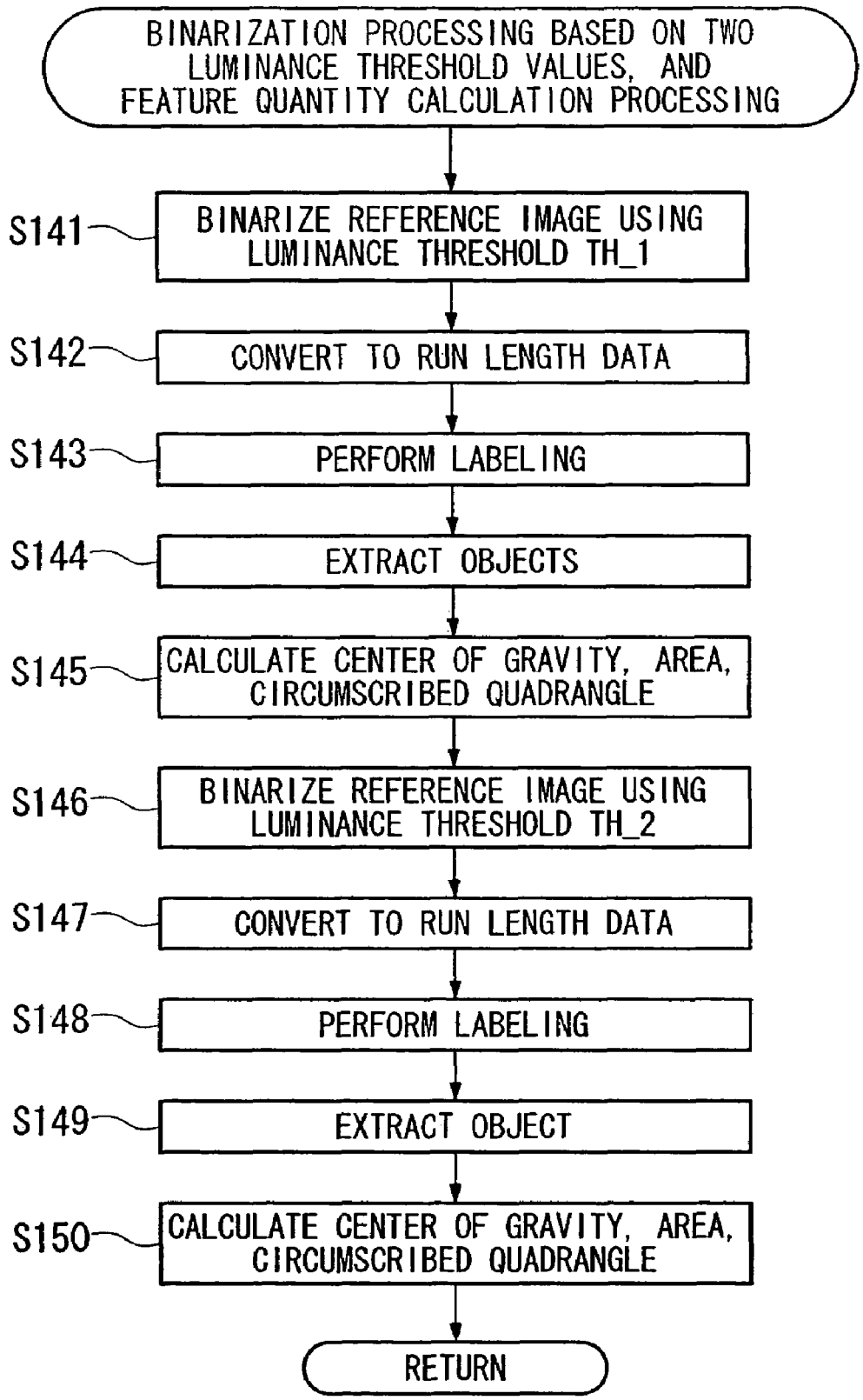
FIG. 24 is a flowchart showing the feature quantity calculation processing for the binarized objects based on two luminance threshold values in this embodiment.

In FIG. 24, when the grayscale image is obtained using the infrared cameras 2R, 2L, the image processing unit 1 assigns the right image obtained by the infrared camera 2R as the reference image, and performs binarization processing of the image signal using the luminance threshold value TH_1, that is regions brighter than the luminance threshold value TH_1 are set to "1" (white) and darker regions to "0" (black) (step S141).

Furthermore, when the image data binarized from the infrared images using the threshold value TH_1 is obtained, processing is performed to convert the binarized image data to run length data (step S142).

Next, by labeling objects from the image data converted to run length data (step S143), processing to extract binarized objects is performed (step S144).

When the binarized object extraction is completed, next the centers of gravity G, the areas S, and the aspect ratios ASPECT of the circumscribed quadrangles, are calculated (step S145) in the same manner as the processing in step S8 of the object detection and warning operation described in the first embodiment using FIG. 3.

Next, in the same manner, the image processing unit 1 assigns the right image obtained by the infrared camera 2R as the reference image, and performs binarization processing of the image signal using the luminance threshold value TH_2 (step S146).

Furthermore, when the image data binarized from the infrared images using the threshold value TH_2 is obtained, processing is performed to convert the binarized image data to run length data (step S147).

Next, by labeling objects from the image data converted to run length data (step S148), processing to extract binarized objects is performed (step S149).

When the binarized object extraction is completed, next the centers of gravity G, the areas S, and the aspect ratios ASPECT of the circumscribed quadrangles, are calculated (step S149) in the same manner as the processing in step S8 of the object detection and warning operation described in the first embodiment using FIG. 3, thereby completing the binarization processing based on two luminance threshold values and the binarized object feature quantity calculation process.

Because the warning determination processing and the pedestrian determination processing in the present embodiment are the same as in the first embodiment, a description thereof is omitted here.

Furthermore, in the present embodiment, the image processing unit 1 includes a binarized object extraction device, a binarized object feature quantity calculation device, an object image extraction device, an object image feature quantity calculation device, a feature quantity comparison device, a body state determination device, and a pedestrian recognition device. More specifically, the processing in step S125 in FIG. 21 and step S141 and step S146 in FIG. 24 corresponds to the binarized object extraction device, the processing in step S71 in FIG. 13, step S125 in FIG. 21 and step S142 through step S145 and step S147 through step S150 in FIG. 24 corresponds to the binarized object feature quantity calculation device, and the processing in step S33 in FIG. 7 and step S73 in FIG. 13 corresponds to the object image extraction device and the object image feature quantity calculation device. Furthermore, the processing in step S126 through step S130 in FIG. 21 corresponds to the feature quantity comparison device, the processing step S131 through step S133 in FIG. 21 corresponds to the body state determination device, and the processing in step S72 and step S74 through step S118 in FIG. 13 through FIG. 18 corresponds to the pedestrian recognition device.

As described above, with the vehicle environment monitoring device of the present embodiment, at normal times the higher the threshold value used in the binarization process the smaller the area of the binarized object which contains a single body, but when the state of the body is affected by raindrops attached to the camera lens, water vapor or raindrops in the air, or wetness or the like, the area of the binarized object which contains a single body tends not to change even when the threshold value used in the binarization process is varied, and therefore, a distinction can be made between a state in which the vehicle environment and the infrared cameras 2R and 2L are normal and a state in which the image is being affected by rainfall (including cases where the camera lens is dirty) by comparing the absolute value (|S1−S2|) of the difference between the area S1 and S2 of the two types of binarized objects with different luminance thresholds and corresponding to the same body to a predetermined value, thereby determining whether or not the there is variation in the area.

Accordingly, in the same manner as in the first embodiment, because the state of a body can be determined without relying on wiper operation signals or a raindrop sensor, there is no need to provide the sensors and the like required by these systems, which lowers the cost and improves the reliability of body state determination, and this has an effect of enabling a vehicle environment monitoring device to be realized which can determine the state of a body correctly.

In addition, in the same manner as for the first embodiment, by changing the method of detecting pedestrians for a state in which the environment of the vehicle 10 and the infrared cameras 2R and 2L are normal (not affected by rainfall) and a state in which the environment of the vehicle 10 and the infrared cameras 2R and 2L are being affected by rainfall, pedestrian detection errors resulting from determinations based on luminance dispersion can be prevented.

Accordingly, in the same manner as for the first embodiment, because the state of a body can be determined without relying on signal detection or the like, for example wiper operation signals or a raindrop sensor, there is no need to provide the sensors and the like required by these systems, and an effect is obtained whereby the cost is lowered and the reliability of pedestrian recognition is improved, and a vehicle environment monitoring device can be realized which can recognize pedestrians only in a stable manner. In addition, an effect is obtained whereby regardless of the state of the environment of the vehicle 10 and the infrared cameras 2R and 2L, the accuracy of the pedestrian detection can be maintained. Furthermore, in contrast to a case in which the state of the histogram of the entire image is used to determine whether rain is falling, the state of the body can be determined directly, which has an effect of enabling a vehicle environment monitoring device to be realized which can recognize pedestrians only in a stable manner without being affected by the contents of the background.

Furthermore, when comparing the absolute value (|S1−S2|) of the difference between the area S1 and S2 of the two types of binarized objects with different luminance thresholds, by increasing the number of bodies (objects) which undergo comparison, and distinguishing between a state in which the environment of the vehicle 10 and the infrared cameras 2R and 2L are normal and a state in which the image is being affected by rainfall (including cases where the camera lens is dirty) collectively from the proportion of positive determination results relative to the total number of bodies, an effect is obtained whereby the reliability of the body state determination and the reliability of the pedestrian recognition in the pedestrian recognition determination device are further improved, and errors in body state determination and pedestrian recognition can be prevented.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle environment monitoring device, which detects bodies present in the environment of a vehicle from infrared images taken by infrared cameras, which comprises:
   a binarized object extraction device which by binarizing grayscale images of the infrared images, extracts the bodies as binarized objects;
   a binarized object feature quantity calculation device which calculates a feature quantity of the binarized objects;
   an object image extraction device which extracts an image of grayscale objects from the grayscale image, the grayscale objects corresponding to the binarized objects;
   an object image feature quantity calculation device which calculates a feature quantity of the grayscale objects;
   a feature quantity comparison device which compares to each other the feature quantity extracted by the binarized object feature quantity calculation device and the feature quantity extracted by the object image feature quantity calculation device; and
   a body state determination device which determines the state of the bodies as affected by a surrounding environment thereof based on the results of the comparison performed in the feature quantity comparison device;
   wherein said feature quantity comparison device compares for a plurality of bodies the feature quantity extracted by said binarized object feature quantity calculation device and the feature quantity extracted by said object image feature quantity calculation device, and
   said body state determination device determines the state of said bodies according to a proportion of bodies specified by the results of the comparison of said feature quantity comparison device.

2. A vehicle environment monitoring device, which detects bodies present in the environment of a vehicle from infrared images taken by infrared cameras, which comprises:
   a binarized object extraction device which by binarizing grayscale images of the infrared images, extracts the bodies as binarized objects;
   a binarized object feature quantity calculation device which calculates a feature quantity of the binarized objects;
   an object image extraction device which extracts an image of grayscale objects from the grayscale image, the grayscale objects corresponding to the binarized objects;
   an object image feature quantity calculation device which calculates a feature quantity of the grayscale objects;

a feature quantity comparison device which compares to each other the feature quantity extracted by the binarized object feature quantity calculation device and the feature quantity extracted by the object image feature quantity calculation device; and a body state determination device which determines the state of the bodies as affected by a surrounding environment thereof based on the results of the comparison performed in the feature quantity comparison device;

wherein said feature quantity comparison device compares the feature quantity extracted by said binarized object feature quantity calculation device and the feature quantity extracted by said object image feature quantity calculation device across a plurality of image frames, and said body state determination device determines the state of said bodies according to a proportion of image frames where the proportion of bodies specified based on the comparison results of said feature quantity comparison device is at or above a predetermined level.

3. A vehicle environment monitoring device which detects bodies present in the environment of a vehicle from infrared images taken by infrared cameras, comprising:

a binarized object extraction device which by binarizing grayscale images of said infrared images, extracts said bodies as binarized objects;

a binarized object feature quantity calculation device which calculates a feature quantity of said binarized objects;

an object image extraction device which extracts an image of a grayscale object from said grayscale image, the grayscale object corresponding to a binarized object;

an object image feature quantity calculation device which calculates a feature quantity of said grayscale image;

a pedestrian recognition device which determines which objects are pedestrians using the feature quantity extracted by said binarized object feature quantity calculation device and the feature quantity extracted by said object image feature quantity calculation device; and a feature quantity comparison device which compares to each other the feature quantity extracted by said binarized object feature quantity calculation device and the feature quantity extracted by said object image feature quantity calculation device to each other, wherein said pedestrian recognition device changes a pedestrian recognition processing method thereof based on the comparison results of said feature quantity comparison device, said feature quantity comparison device compares for a plurality of bodies the feature quantity extracted by said binarized object feature quantity calculation device and the feature quantity extracted by said object image feature quantity calculation device, and said pedestrian recognition device changes said pedestrian recognition processing method according to a proportion of bodies specified based on the results of the comparison of said feature quantity comparison device.

4. A vehicle environment monitoring device which detects bodies present in the environment of a vehicle from infrared images taken by infrared cameras, comprising:

a binarized object extraction device which by binarizing grayscale images of said infrared images, extracts said bodies as binarized objects;

a binarized object feature quantity calculation device which calculates a feature quantity of said binarized objects;

an object image extraction device which extracts an image of a grayscale object from said grayscale image, the grayscale object corresponding to a binarized object;

an object image feature quantity calculation device which calculates a feature quantity of said grayscale image;

a pedestrian recognition device which determines which objects are pedestrians using the feature quantity extracted by said binarized object feature quantity calculation device and the feature quantity extracted by said object image feature quantity calculation device; and a feature quantity comparison device which compares to each other the feature quantity extracted by said binarized object feature quantity calculation device and the feature quantity extracted by said object image feature quantity calculation device to each other, wherein said pedestrian recognition device changes a pedestrian recognition processing method thereof based on the comparison results of said feature quantity comparison device, said feature quantity comparison device compares the feature quantity extracted by said binarized object feature quantity calculation device and the feature quantity extracted by said object image feature quantity calculation device across a plurality of image frames, and said pedestrian recognition device changes said pedestrian recognition processing method according to a proportion of image frames where the proportion of bodies specified based on the comparison results of said feature quantity comparison device is at or above a predetermined level.

5. A vehicle environment monitoring device according to claim 1, wherein said feature quantity comparison device compares the height of the binarized object extracted by said binarized object feature quantity calculation device and the height of the grayscale object extracted by said object image feature quantity calculation device.

6. A vehicle environment monitoring device according to claim 1, wherein said feature quantity comparison device compares the width of the binarized object extracted by said binarized object feature quantity calculation device and the width of the grayscale object extracted by said object image feature quantity calculation device.

7. A vehicle environment monitoring device which detects bodies present in the environment of a vehicle from infrared images taken by infrared cameras, comprising:

a binarized object extraction device which extracts said bodies as a plurality of binarized objects, by plural binarizations of a grayscale image from said infrared cameras according to a plurality of luminance threshold values;

a binarized object feature quantity calculation device which respectively calculates a feature quantity of each of said plurality of binarized objects with different luminance threshold values;

a feature quantity comparison device which compares to each other the feature quantities of said plurality of binarized objects with different luminance threshold values extracted by said binarized object feature quantity calculation device; and a body state determination device which determines the state of said bodies as affected by a surrounding environment thereof based on the comparison results of said feature quantity comparison device;

wherein said feature quantity comparison device compares to each other the feature quantities of said plurality of binarized objects with different luminance threshold values extracted by said binarized object feature quantity calculation device, for a plurality of bodies, and said body state determination device determines the state of said bodies according to a proportion of bodies specified based on the results of the comparison of said feature quantity comparison device.

8. A vehicle environment monitoring device which detects bodies present in the environment of a vehicle from infrared images taken by infrared cameras, comprising:

a binarized object extraction device which plurally extracts each of said bodies to form a plurality of binarized objects, by binarizing grayscale images from said infrared cameras according to a plurality of luminance threshold values, each of the plurality of binarized objects comprising a unique luminance threshold value;

a binarized object feature quantity calculation device which respectively calculates a feature quantity of said plurality of binarized objects with different luminance threshold values;

an object image extraction device which extracts images of grayscale objects corresponding to said binarized objects from said grayscale images;

an object image feature quantity calculation device which calculates a feature quantity of said grayscale objects;

a pedestrian recognition device which recognizes pedestrians using the feature quantity extracted by said binarized object feature quantity calculation device and the feature quantity extracted by said object image feature quantity calculation device; and a feature quantity comparison device which compares to each other the feature quantity of said plurality of binarized objects with different luminance threshold values extracted by said binarized object feature quantity calculation device, and said pedestrian recognition device changes a pedestrian recognition processing method thereof based on the comparison results of said feature quantity comparison device, wherein said feature quantity comparison device compares to each other the feature quantity of said plurality of binarized objects with different luminance threshold values extracted by said binarized object feature quantity calculation device, for a plurality of bodies, and said pedestrian recognition device changes said pedestrian recognition processing method according to a proportion of bodies specified based on the results of the comparison of said feature quantity comparison device.

9. A vehicle environment monitoring device according to claim 3 wherein said feature quantity comparison device compares the height of the binarized object extracted by said binarized object feature quantity calculation device and the height of the grayscale object extracted by said object image feature quantity calculation device.

10. A vehicle environment monitoring device according to claim 3, wherein said feature quantity comparison device compares the width of the binarized object extracted by said binarized object feature quantity calculation device and the width of the grayscale object extracted by said object image feature quantity calculation device.

11. A vehicle environment monitoring device according to claim 1, wherein said feature quantity comparison device compares for each body of a plurality of bodies the feature quantity extracted by said binarized object feature quantity calculation device and the feature quantity extracted by said object image feature quantity calculation device, and said body state determination device determines the state of said bodies as affected by the surrounding environment thereof by calculation of a proportion comprising the number of bodies of said plurality of bodies wherein the results of the comparison of said feature quantity comparison device indicate a specified body state, relative to the total number of bodies of said plurality of bodies, and comparison of the proportion to a threshold value.

12. A vehicle environment monitoring device according to claim 5 wherein the grayscale object is extracted by said object image feature quantity calculation device by applying a plurality of mask regions to the object in the grayscale image, and wherein the region extracted as the grayscale object includes mask regions which meet each of the following criteria:
   i. the amount of luminance variation within the mask region is high;
   ii. there is a high degree of correlation in the mask region between the image of each respective camera; and
   iii. the calculated distance to the grayscale object is the same as the calculated distance to the corresponding binarized object.

13. A vehicle environment monitoring device according to claim 1, wherein said feature quantity comparison device compares at least one of a height and a width of the binarized object extracted by said binarized object feature quantity calculation device to at least one of the height and the width of the grayscale object extracted by said object image feature quantity calculation device.

14. A vehicle environment monitoring device according to claim 7, wherein said feature quantity comparison device compares to each other the area of the plurality of binarized objects with the different luminance threshold values extracted by said binarized object feature quantity calculation device.

15. A vehicle environment monitoring device according to claim 8, wherein said feature quantity comparison device compares to each other the area of the plurality of binarized objects with the different luminance threshold values extracted by said binarized object feature quantity calculation device.

16. A vehicle environment monitoring device according to claim 3, wherein the pedestrian recognition device changes a pedestrian recognition processing method thereof based on a state of the bodies as affected by a surrounding environment thereof which is determined from the comparison performed in the feature quality comparison device.

17. A vehicle environment monitoring device according to claim 8, wherein the pedestrian recognition device changes a pedestrian recognition processing method thereof based on a state of the bodies as affected by a surrounding environment thereof which is determined from the comparison performed in the feature quality comparison device.

18. A vehicle environment monitoring device according to claim 1, wherein the body state determination device determines the state of the bodies as affected by a surrounding environment thereof, including rainfall.

* * * * *